(12) United States Patent
Robbin et al.

(10) Patent No.: US 8,291,320 B2
(45) Date of Patent: Oct. 16, 2012

(54) GRAPHICAL USER INTERFACE FOR BROWSING, SEARCHING AND PRESENTING MEDIA ITEMS

(75) Inventors: Jeffrey L. Robbin, Los Altos, CA (US); Peter K. Wagner, Redwood City, CA (US); Mike Wiese, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1173 days.

(21) Appl. No.: 11/061,321

(22) Filed: Feb. 17, 2005

(65) Prior Publication Data
US 2005/0193094 A1 Sep. 1, 2005

Related U.S. Application Data

(63) Continuation of application No. 10/832,984, filed on Apr. 26, 2004, which is a continuation-in-part of application No. 10/776,652, filed on Feb. 10, 2004, now abandoned.

(60) Provisional application No. 60/465,410, filed on Apr. 25, 2003, provisional application No. 60/534,555, filed on Jan. 5, 2004.

(51) Int. Cl.
*G06F 3/00* (2006.01)
(52) U.S. Cl. ........ 715/716; 715/744; 715/784; 715/810; 715/835; 715/838
(58) Field of Classification Search .................. 715/810, 715/727, 835, 838, 776, 716, 784, 744; 345/744
See application file for complete search history.

(56) References Cited

U.S. PATENT DOCUMENTS

| | | | |
|---|---|---|---|
| 5,635,978 A | 6/1997 | Alten et al. | |
| 5,680,323 A | 10/1997 | Barnard | |
| 5,715,403 A | 2/1998 | Stefik | |
| 5,719,789 A | 2/1998 | Kawamata | |
| 5,864,868 A * | 1/1999 | Contois | 707/104.1 |
| 5,963,915 A | 10/1999 | Kirsch | |
| 5,963,916 A | 10/1999 | Kaplan | |
| 6,011,537 A | 1/2000 | Slotznick | |
| 6,226,618 B1 | 5/2001 | Downs | |
| 6,232,973 B1 * | 5/2001 | Dow et al. | 715/810 |
| 6,233,682 B1 | 5/2001 | Fritsch | |
| 6,236,971 B1 | 5/2001 | Stefik et al. | |
| 6,248,946 B1 | 6/2001 | Dwek | |
| 6,317,784 B1 | 11/2001 | Mackintosh et al. | |
| 6,346,951 B1 * | 2/2002 | Mastronardi | 715/716 |
| 6,385,596 B1 | 5/2002 | Ansell et al. | |
| 6,446,080 B1 | 9/2002 | Van Ryzin et al. | |

(Continued)

FOREIGN PATENT DOCUMENTS

EP 0 927 945 B1 7/1999

(Continued)

OTHER PUBLICATIONS

International Search Report and Written Opinion dated Nov. 1, 2005 for corresponding International Application No. PCT/US04/12851.

(Continued)

*Primary Examiner* — Robert Stevens
*Assistant Examiner* — Sherrod Keaton

(57) ABSTRACT

Improved graphical user interfaces suitable for reviewing, browsing, previewing and/or purchasing media items are disclosed. The graphical user interfaces are particularly useful for a system that provides purchase and distribution of media in a client-server environment.

39 Claims, 26 Drawing Sheets

U.S. PATENT DOCUMENTS

| | | | |
|---|---|---|---|
| 6,452,609 B1 | 9/2002 | Katinsky et al. | |
| 6,590,595 B1* | 7/2003 | Wagner et al. | 715/784 |
| 6,731,312 B2 | 5/2004 | Robbin | |
| 6,941,324 B2 | 9/2005 | Plastina et al. | |
| 6,976,229 B1* | 12/2005 | Balabanovic et al. | 715/838 |
| 6,976,265 B1 | 12/2005 | Yang et al. | |
| 7,054,888 B2* | 5/2006 | LaChapelle et al. | 1/1 |
| 7,062,468 B2 | 6/2006 | Hillegass et al. | |
| 7,209,892 B1 | 4/2007 | Galuten et al. | |
| 7,228,437 B2* | 6/2007 | Spagna et al. | 713/193 |
| 7,340,451 B2 | 3/2008 | Sacco | |
| 7,345,234 B2 | 3/2008 | Plastina et al. | |
| 7,358,434 B2 | 4/2008 | Plastina et al. | |
| 7,549,129 B2* | 6/2009 | Sheldon et al. | 715/835 |
| 7,797,242 B2 | 9/2010 | Gautier et al. | |
| 2001/0033296 A1 | 10/2001 | Fullerton et al. | |
| 2002/0002468 A1 | 1/2002 | Geisler et al. | |
| 2002/0016776 A1 | 2/2002 | Chu et al. | |
| 2002/0026575 A1 | 2/2002 | Wheeler et al. | |
| 2002/0033844 A1* | 3/2002 | Levy et al. | 345/744 |
| 2002/0138439 A1 | 9/2002 | Matsushima et al. | |
| 2003/0182139 A1 | 9/2003 | Harris et al. | |
| 2004/0003097 A1 | 1/2004 | Willis et al. | |
| 2004/0216036 A1 | 10/2004 | Chu | |
| 2004/0236957 A1 | 11/2004 | Durand et al. | |
| 2004/0243482 A1 | 12/2004 | Laut | |
| 2004/0268451 A1 | 12/2004 | Robbin | |
| 2005/0021478 A1 | 1/2005 | Gautier et al. | |
| 2005/0071780 A1 | 3/2005 | Robbin et al. | |
| 2005/0091302 A1 | 4/2005 | Soin et al. | |
| 2005/0210509 A1 | 9/2005 | Jones | |
| 2005/0240661 A1 | 10/2005 | Heller et al. | |
| 2005/0268279 A1 | 12/2005 | Paulsen et al. | |
| 2006/0026284 A1 | 2/2006 | Nguyen | |
| 2006/0091203 A1 | 5/2006 | Bakker et al. | |
| 2006/0100978 A1 | 5/2006 | Heller et al. | |
| 2006/0123052 A1 | 6/2006 | Robbin et al. | |
| 2006/0195462 A1 | 8/2006 | Rogers | |
| 2006/0265409 A1 | 11/2006 | Neumann et al. | |
| 2007/0038567 A1 | 2/2007 | Allaire et al. | |
| 2007/0093958 A1 | 4/2007 | Jonsson et al. | |
| 2007/0166687 A1 | 7/2007 | Bell et al. | |
| 2007/0288864 A1 | 12/2007 | Keereepart et al. | |
| 2008/0168355 A1 | 7/2008 | Dunlap et al. | |
| 2011/0040658 A1 | 2/2011 | Gautier et al. | |

FOREIGN PATENT DOCUMENTS

| | | |
|---|---|---|
| FR | A 2 827 981 | 1/2003 |
| JP | 11-161717 A | 6/1999 |
| JP | 2002-99466 | 4/2002 |
| JP | 2002-108881 A | 4/2002 |
| JP | 2002-116933 A | 4/2002 |
| JP | 2002-123264 | 4/2002 |
| JP | 2002-164880 | 7/2002 |
| JP | 2002-318873 | 10/2002 |
| JP | 2003-50745 | 2/2003 |
| WO | WO 99/27681 A | 6/1999 |
| WO | WO 00/43904 | 7/2000 |
| WO | WO 00/43905 | 7/2000 |
| WO | WO 00/62265 | 10/2000 |
| WO | WO 01/41023 | 6/2001 |
| WO | WO 01/44908 | 6/2001 |
| WO | WO 01/46786 | 6/2001 |
| WO | WO 01/65526 A | 9/2001 |
| WO | WO 02/084444 A3 | 10/2002 |
| WO | WO 03/017213 | 2/2003 |
| WO | WO 03/023786 A2 | 3/2003 |

OTHER PUBLICATIONS

Strunk et al., "The Element of Style", Third Edition, 1979, MacMillian Publ. Co., Inc., New York, Ny, all pages.
Burton, "Elementary Number Theory", Fourth Edition, 1998, The McGraw-Hill Companies, Inc., all pages.
Defler, "How Networks Work", Bestseller Edition, 1996, Ziff-Davis Press, Emeryville, CA pp. 1-69.
White, "How Computers Work", Millennium Edition, 1999, Que Corporation, Indianapolis, IN, pp. 1-83.
Gralla, "How the Internet Works", Millennium Edition, 1999, Que Corporation, Indianapolis, IN, pp. 1-36.
Muller, "Desktop Encyclopedia of the Internet", 1999, Artech House Inc., Norwood, MA, pp. 1-51.
"Shop the First online .99 Store", www.apple.com/music/store/shop.html, downloaded Sep. 24, 2003, pp. 1-2.
"The iTunes Music Store. Downloads Done Right", www.apple.com/music/store, downloaded Sep. 24, 2003, pp. 1-3.
Supplemental European Search Report under Article 153(7) EPC for European Patent Application No. 04750682.9 dated Feb. 6, 2009.
Communication pursuant to Article 94(3) EPC for European Patent Application No. 04750682.9 dated May 8, 2009.
First Office Action for Chinese Patent Application No. 200480008888.8 dated Dec. 15, 2006.
Decision of Rejection for Chinese Patent No. 200480008888.8 dated Jul. 6, 2007.
Notification of Reexamination for Chinese Patent No. 200480008888.8 dated Feb. 10, 2009.
Decision of Rejection for Chinese Patent No. 200480008888.8 dated Jun. 22, 2009.
Office Action for U.S. Appl. No. 10/903,496 mailed Feb. 3, 2009.
Notification of Reason for Rejection for Japanese Patent Application No. 2006-513344 dated Nov. 17, 2009.
Final Office Action for U.S. Appl. No. 10/903,496, mailed Mar. 9, 2010.
Advisory Action for U.S. Appl. No. 10/903,496, mailed May 24, 2010.
Advisory Action for U.S. Appl. No. 10/832,984, mailed Jun. 22, 2010.
Notice of Allowance for U.S. Appl. No. 10/903,496, mailed Aug. 5, 2010.
Office Action for U.S. Appl. No. 10/832,984, mailed Mar. 29, 2011.
Decision of Rejection for Japanese Patent Application No. 2006-513344, mailed Oct. 5, 2010.
Notification of the First Office Action for Chinese Patent Application No. 200910174656.4, dated Apr. 22, 2011.
Office Action for Chinese Patent Application No. 200910174656.4, dated Apr. 22, 2011.
Summons to Attend Oral Proceedings for European Patent Application No. 04750682.9, dated Sep. 1, 2011.
Office Action for Japanese Patent Application No. 2010-113630, mailed Sep. 27, 2011.
Shirai, Kazu, Mac People Beginners. vol. 5, ASCII Corporation, Japan, Apr. 1, 2001, vol. 5, pp. 52-59.
Nomura, "Complete Guide for Using Software and Peripherals", 1st edition, Ohmsha, ltd.
Extended European Search Report for European Patent Application No. 11162654.5, dated Jun. 1, 2011.
Office Action for U.S. Appl. No. 10/832,984, mailed Apr. 1, 2008.
Final Office Action for U.S. Appl. No. 10/832,984, mailed Nov. 13, 2008.
Advisory Action for U.S. Appl. No. 10/832,984, mailed Feb. 18, 2009.
Office Action for U.S. Appl. No. 10/832,984, mailed May 29, 2009.
Final Office Action for U.S. Appl. No. 10/832,984, mailed Apr. 1, 2010.
Decision to refuse a European Patent Application for European Patent Application No. 04750682.9, mailed Jan. 18, 2012.

* cited by examiner

GRAPHICAL USER INTERFACE FOR BROWSING, SEARCHING AND PRESENTING MEDIA ITEMS

CROSS-REFERENCE TO RELATED APPLICATIONS

This application is a continuation of U.S. patent application Ser. No. 10/832,984, filed Apr. 26, 2004, and entitled "GRAPHICAL USER INTERFACE FOR BROWSING, SEARCHING AND PRESENTING MEDIA ITEMS", which is hereby incorporated by reference herein, which is a Continuation-In-Part of U.S. patent application Ser. No. 10/776,652, filed Feb. 10, 2004 now abandoned, and entitled "GRAPHICAL USER INTERFACE FOR BROWSING, SEARCHING AND PRESENTING MEDIA ITEMS", which is hereby incorporated by reference herein, and which claims the benefit of: (i) U.S. Provisional Patent Application No. 60/465,410, filed Apr. 25, 2003, and entitled "METHOD AND SYSTEM FOR SECURE NETWORK-BASED DISTRIBUTION OF MEDIA", which is hereby incorporated by reference herein; and (ii) U.S. Provisional Patent Application No. 60/534,555, filed Jan. 5, 2004, and entitled "GRAPHICAL USER INTERFACE FOR BROWSING, SEARCHING AND PRESENTING MEDIA ITEMS", which is hereby incorporated by reference herein.

This application is also related to: (i) U.S. patent application Ser. No. 10/833,267, filed Apr. 26, 2004, and entitled "METHOD AND SYSTEM FOR NETWORK-BASED PURCHASE AND DISTRIBUTION OF MEDIA", which is hereby incorporated by reference herein; and (ii) U.S. patent application Ser. No. 10/832,812, filed Apr. 26, 2004, and entitled "METHOD AND SYSTEM FOR SECURE NETWORK-BASED DISTRIBUTION OF CONTENT", which is hereby incorporated by reference herein.

BACKGROUND OF THE INVENTION

1. Field of the Invention

The present invention relates to media purchase and distribution and, more particularly, to media purchase and distribution in a client-server environment.

2. Description of the Related Art

Traditionally, music has been purchased at music stores or music departments of larger stores. A consumer will visit the music store or department and manually browse for albums or compact discs (CDs) of interest. Often, the music in the music store or department is categorized by genre, and then indexed by artist. For example, genre can include rock, country, pop, soul, jazz, etc. After the consumer selects an album or CD of interest, the consumer proceeds to a check-out register to pay for the album or CD being purchased.

In recent years music delivery or distribution over the Internet has become popular. Due to the advances in efficient file formats, such as MP3 and MPEG4, the size of media files have become small enough to make their download via the Internet practical. Also, technological advances have led to higher-speed Internet connections and lower cost of memory. The combination of these advances make downloading media files, such as for music and videos, manageable and not too time consuming.

One popular approach to music distribution was mp3.com which uses a centralized server for storage of the numerous songs that are available for download. Another popular approach to music distribution was Napster in which peer-to-peer sharing was utilized. With peer-to-peer sharing, the numerous songs reside on the user machines of the many users, not on a centralized server.

However, unrestricted use and distribution of music files can lead to copyright violations. It is, therefore, desirable for companies to be endorsed by the music industry. However, to obtain endorsement, companies must charge users for access to the songs. Some companies charge a monthly subscription fee and permit subscribers to play songs by streaming such to the subscriber's machine where the songs are played. Streaming does not store the music files on the subscriber's machine, and thus is less of a concern for the music industry. However, such a system requires a network connection and network availability in order for subscribers to play songs.

As a result, there is a need to permit songs to be purchased and then made available locally to purchasers so that the purchaser is not dependent and constrained by the availability of a network connection for playback of the songs.

SUMMARY OF THE INVENTION

Broadly speaking, the invention relates a graphical user interface suitable for reviewing, browsing, previewing and/or purchasing media items. The graphical user interface can be presented to a user at a client (client machine). In one embodiment, the graphical user interface is presented to the user by an application program that runs on the client.

The graphical user interface is particularly useful for a system that provides purchase and distribution of media in a client-server environment. The purchase and distribution of media can not only be secure but also controlled. The controlled distribution can use encryption and user accounts to not only restrict unauthorized access to the media but also to limit usage rights to the media by authorized users. The security restricts access to media within media files during downloads as well as while stored at a server and/or client. The graphical user interface can assist users in locating media to be purchased. The media can, for example, be audio, video, or image data.

The invention can be implemented in numerous ways, including as a method, system, device, apparatus, graphical user interface, or computer readable medium. Several embodiments of the invention are discussed below.

As a method for browsing media items via a client application program that connects to an online media store, one embodiment of the invention includes the acts of: displaying an application program window associated with the client application program, the application program window including at least one sub-window; displaying a first set of media item representations in the sub-window, the media item representations corresponding to a plurality of media items; displaying a first direction control within or proximate to a first side of the sub-window; displaying a second direction control within or proximate to a second side of the sub-window; and moving the media item representations through the sub-window in a first direction in response to receiving a user selection of the first direction control or in a second direction in response to receiving a user selection of the second direction control, to thereby display a second set of media item representations in the sub-window, where at least one of the media item representations of the second set of media item representations is different than the media item representations of the first set of media item representations.

As a graphical user interface for scrolling through a plurality of media items, one embodiment of the invention includes at least: an application program window associated with a client application program; at least one sub-window, within the application program window, for displaying a plurality of media item representations, the media item representations corresponding to a plurality of media items; a first-side transition control for requesting first direction scrolling of the media item representations within the at least one sub-window; and a second-side transition control for requesting second direction scrolling of the media item representations within the at least one sub-window.

As a graphical user interface for browsing through a plurality of media items, another embodiment of the invention includes at least: a window, associated with a client application program, for displaying a plurality of media item representations, the media item representations corresponding to a plurality of media items, the media item representations being provided to the client application program by an online media store via a network; a first-side transition control for requesting a first transition effect of the media item representations within the window; and a second-side transition control for requesting a second transition effect of the media item representations within the window.

As a computer readable medium including at least computer program code for browsing media items via a client application program that connects to an online media store, one embodiment of the invention includes at least: computer program code for displaying a plurality of media item representations in a window, the media item representations corresponding to a plurality of media items; computer program code for displaying a first direction control within or proximate to a first side of the window; computer program code for displaying a second direction control within or proximate to a second side of the window; computer program code for moving the media item representations through the window in a first direction in response to receiving a user selection of the first direction control; and computer program code for moving the media item representations through the window in a second direction in response to receiving a user selection of the second direction control.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates a graphical user interface suitable for reviewing, browsing, previewing and/or purchasing media items. The graphical user interface can be presented to a user at a client (client machine). In one embodiment, the graphical user interface is presented to the user by an application program that runs on the client.

The graphical user interface is particularly useful for a system that provides purchase and distribution of media in a client-server environment. The purchase and distribution of media can not only be secure but also controlled. The controlled distribution can use encryption and user accounts to not only restrict unauthorized access to the media but also to limit usage rights to the media by authorized users. The security restricts access to media within media files during downloads as well as while stored at a server and/or client. The graphical user interface can assist users in locating media to be purchased. The media can, for example, be audio, video, or image data.

Embodiments of various aspects of the invention are discussed below with reference to FIGS. 1-16. However, those skilled in the art will readily appreciate that the detailed description given herein with respect to these figures is for explanatory purposes as the invention extends beyond these limited embodiments.

One aspect of the invention pertains to a system and method for purchasing media items over a network. A potential purchaser can search and browse through numerous media items that are available for purchase. A potential purchaser can purchase a media item with great ease. Upon purchasing a media item, the content for the media item can be downloaded over the network to the purchaser. The content for the media item is then encrypted for the purchaser's use and stored on the purchaser's machine. Thereafter, the purchaser can make use of the media item (e.g., play the media item). However, the use of the media item can still be limited. For example, only up to a predetermined number user machines can be authorized to use the media item, or only up to a predetermined number of compact disc copies can be made of a grouping or collection of media items (e.g., a playlist).

Figure 1:
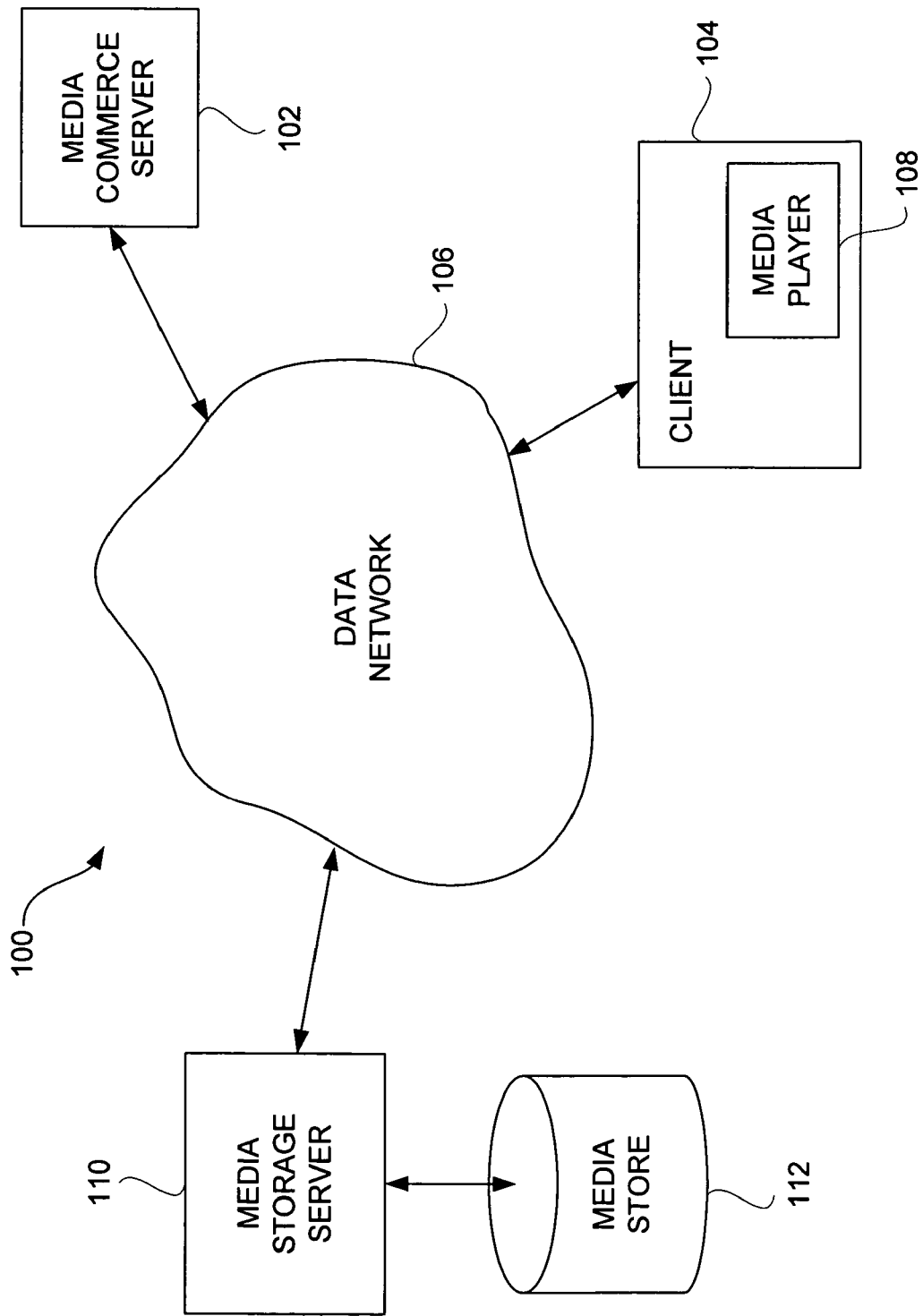
FIG. 1 is a block diagram of a media purchase system according to one embodiment of the invention.

FIG. 1 is a block diagram of a media purchase system 100 according to one embodiment of the invention. The media purchase system 100 includes a media commerce server 102. The media commerce server 102 coordinates review and/or purchase of media items through on-line transactions. On-line transactions to purchase media items is also referred to as electronic commerce (e-commerce). The media purchase system 100 also includes a client 104. Typically, the media purchase system 100 would include a plurality of different clients 104. Each client 104 includes a media player 108. The media player 108 is an application program (e.g., software application) that operates on the client 104, which is a computing device. The client 104 is coupled to the media commerce server 102 through a data network 106. Hence, any of the clients 104 can interact with the media commerce server 102 to review and/or purchase media items. In one embodiment, the data network 106 includes at least a portion of the Internet. The clients 104 can vary with application but generally are computing devices that have memory storage. Often, the clients 104 are personal computers or other computing devices that are capable of storing and presenting media to their users.

The media purchase system 100 also includes a media storage server 110 and a media store 112. The media storage server 110 represents a remote storage server that couples to the data network 106. The media store 112 provides mass storage of the numerous media items that are available for purchase via the media purchase system 100. Once purchased, the media items can be accessed from the media store 112 over the data network 106 by way of the media storage server 110.

More particularly, the media purchase system 100 allows a user of the client 104 to utilize the media player 108 to browse, search or sort through a plurality of media items that can be purchased from the media commerce server 102. The media player 108 may also allow the user to preview a media clip of the media items. In the event that the user of the media player 108 desires to purchase a particular media item, the user (via the media player 108) and the media commerce server 102 engage in an on-line commerce transaction in which the user pays for access rights to the particular media item. In one embodiment, a credit card associated with the user is credited for the purchase amount of the particular media item.

In the media purchase system 100 shown in FIG. 1, the media items are stored in the media store 112 and retrieved via the media storage server 110. Hence, the media commerce server 102 need not burden its resources to deliver any of the media items that may be purchased to the client 104. Instead, on purchasing a particular media item, the media commerce server 102 sends download information to the media player 108 on the client 104. The download information can then be used by the media player 108 (and the client 104) to retrieve the media content for the particular media item by interacting with the media storage server 110 through the data network 106. In this regard, the media storage server 110 obtains the media content corresponding to the particular media item from the media store 112 and downloads such content through the data network 106 to the client 104. The downloaded media content can then be stored on the client 104. In one embodiment, the downloaded media content is stored on the client 104 as received. In another embodiment, the downloaded media content is transcrypted from one encryption key to another encryption key before persistent storage on the client 104. In still another embodiment, the downloaded media content is encrypted as received at the client 104 but is decrypted and then re-encrypted before persistent storage on the client 104. Thereafter, the media player 108 can present (e.g., play) the media content at the client 104.

The connections through the data network 106 between the media commerce server 102, the client 104 and the media storage server 110 can be through secure connections, such as Secure Sockets Layer (SSL). Further, the media content is stored at the client 104 in an encrypted manner.

As discussed in greater detail below, the media player 108 can utilize an improved graphical user interface. More particularly, in one embodiment, a window presented on a display device of the client 104, when executing the media player 108, includes an upper window that displays content provided by the media commerce server 102 in a browser-like manner, and a lower window displays content provided by the media commerce server 102 in a typical media player-like manner. In another embodiment, a window presented on a display device of the client 104, when executing the media player 108, includes an upper window that displays a multi-tier browse interface that implements a browse function with respect to the media items through interaction with the media commerce server 102.

Figure 2A:
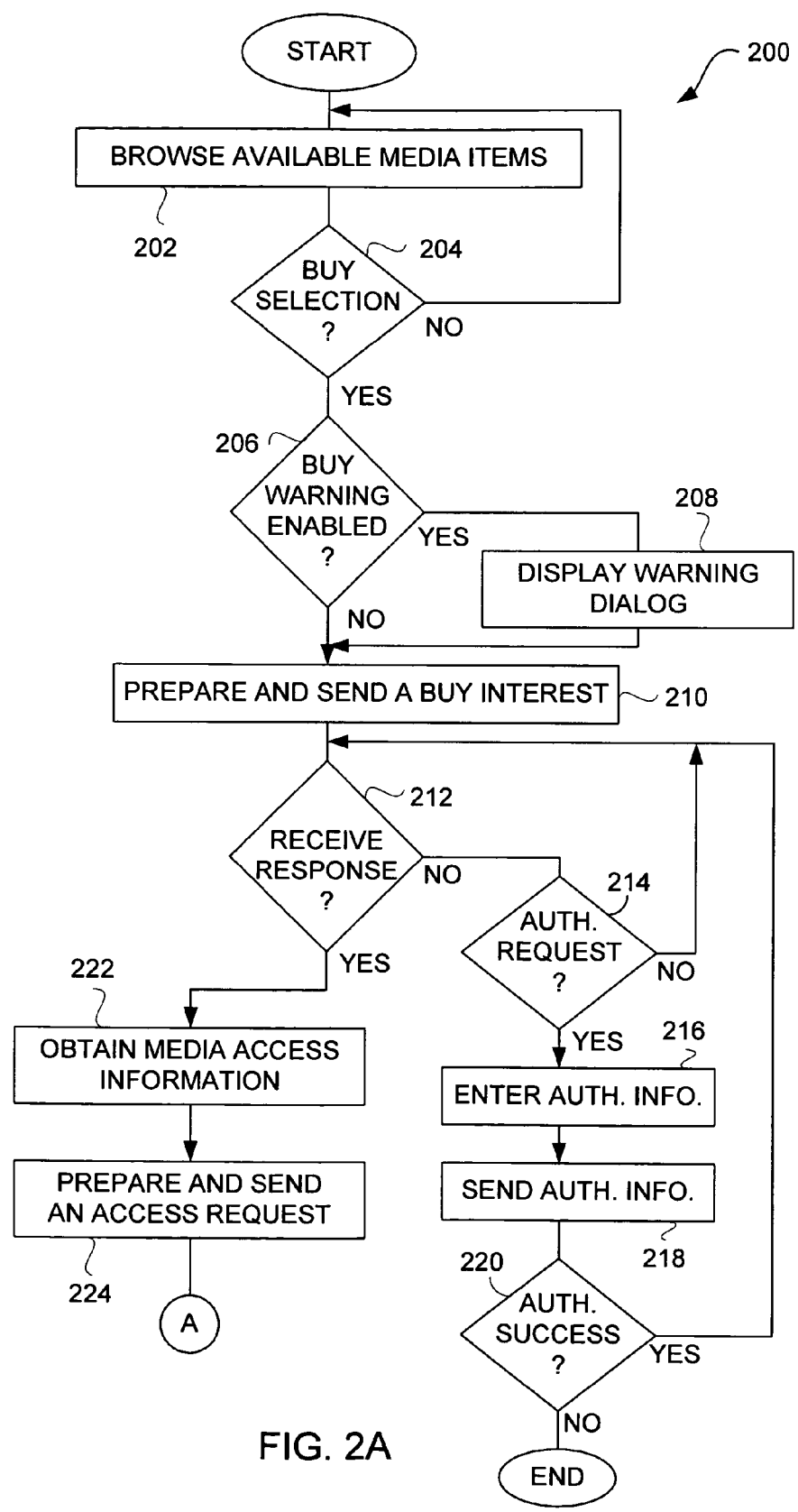
FIGS. 2A and 2B are flow diagrams of media purchase processing according to one embodiment of the invention.
Figure 2B:
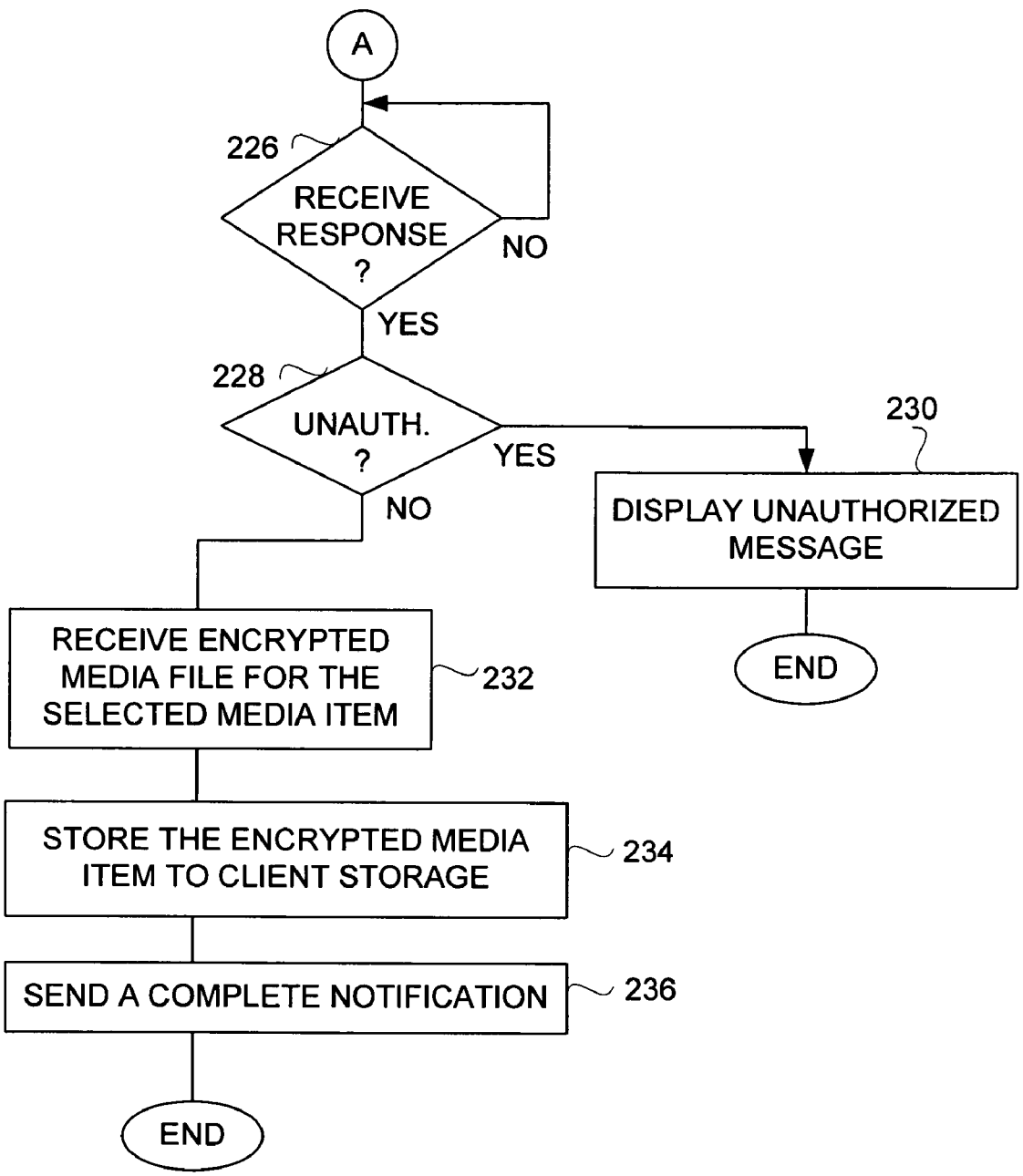

FIGS. 2A and 2B are flow diagrams of media purchase processing 200 according to one embodiment of the invention. The media purchase processing 200 is, for example, processing associated with a media player of a media purchase system. The media player can, for example, be the media player 108 operating on the client 104 illustrated in FIG. 1.

The media purchase processing 200 initially permits a user to browse 202 available media items. Typically, the media purchase system supports the purchase of a large number of media items. Hence, the ability to browse, sort and search the available media items is beneficial.

Next, a decision 204 determines whether a buy selection has been made. Here, in one embodiment, the buy selection is a single user interface action, such as one click of a button. The buy selection is with respect to a selected media item. The buy selection means that the user desires to purchase the selected media item. When the decision 204 determines that the buy selection has not yet been received, then the processing returns to repeat the operation 202 and subsequent operations. Once the decision 204 determines that a buy selection has been made, a decision 206 determines whether a buy warning is enabled. When the decision 206 determines that a buy warning is enabled, then a warning dialog is displayed 208 to the user of the media player. The warning dialog serves to warn the user that the buy transaction will be performed unless now canceled.

Following the operation 208, as well as directly following the decision 206 when the buy warning is not enabled, a buy request is prepared and sent 210 to a media server (e.g., the media commerce server 102) of the media purchase system. After the buy request has been prepared and sent 210, a decision 212 determines whether a response has been received. When the decision 212 determines that a response has not yet been received, a decision 214 determines whether an authentication request is instead received. When the decision 214 determines that an authentication request is not received, then the media purchase processing 200 returns to repeat the decision 212 and subsequent operations. On the other hand, when the decision 214 determines that an authentication is to be performed, then authorization information is entered 216. Here, the authorization information can be provided or entered 216 by the user associated with the media player. Subsequently, the authentication information that has been entered 216 is sent 218 to the media server.

Following the operation 218, a decision 220 determines whether the authentication has been successful. When the decision 220 determines that authentication has been successful, then the media purchase processing 200 returns to repeat the decision 212 and subsequent operations. On the other hand, when the decision 220 determines that authentication has been unsuccessful, the media purchase processing 200 is complete and ends.

Alternatively, when the decision 212 determines that a response to the buy request has been received, media access information is obtained 222. The response to the buy request includes at least the media access information. According to one embodiment, the media access information informs the media player as to where to locate the appropriate media file that has been purchased as well as a download key and a security token. The download key is later used in decrypting the media file. The security token is used in verifying that the right to download the media file has been purchased. In one embodiment, the location of the appropriate media file resides on a media storage server, such as the media storage server 110. Typically, the media storage server is a centralized repository for media files. After the media access information has been obtained 222, an access request for the appropriate media file is prepared and sent 224. The access request is a request to the media storage server that stores the appropriate media file. In one example, the location of the appropriate media file can be designated by a Universal Resource Locator (URL).

Next, a decision 226 determines whether a response has been received. Here, the response, if received, pertains to the access request that was prepared and sent 224. When the decision 226 determines that a response to the access request has not yet been received, the media purchase processing 200 awaits such a response. Next, a decision 228 determines whether the user is authorized. Here, the response will either indicate that the request failed due to a lack of authorization or has succeed and provides (e.g., downloads) the requested media file. When the decision 228 determines that the received response indicates failed authorization, then an unauthorized message is displayed 230 indicating that access to the requested media file is denied. Following the operation 230, when the user is not authorized, the media purchase processing 200 is complete and ends.

On the other hand, when the decision 228 determines that the user is authorized to receive the response, the encrypted media file for the selected media item is received 232. The encrypted media file can be received as part of the response or following the response. Then, the encrypted media item can be stored 234 to the client storage, and a complete notification can be sent 236. The complete notification can be sent 236 before or after the storage 234. At this point, the user of the client can thereafter present (e.g., play) the media content within the encrypted media item from the client storage after first decrypting the same using an appropriate key. The appropriate key is, for example, a user key that is associated with a user's account with the media purchase system 100. Optionally, after the encrypted media item is received 232 and before its storage to the client storage, the encryption imposed on the media item can be altered, such as by transcryption from one encryption key (e.g., download key) to another encryption key (e.g., user key) or by decryption from one encryption key (e.g., download key) followed by re-encrypted with another encryption key (e.g., user key).

Figure 3:
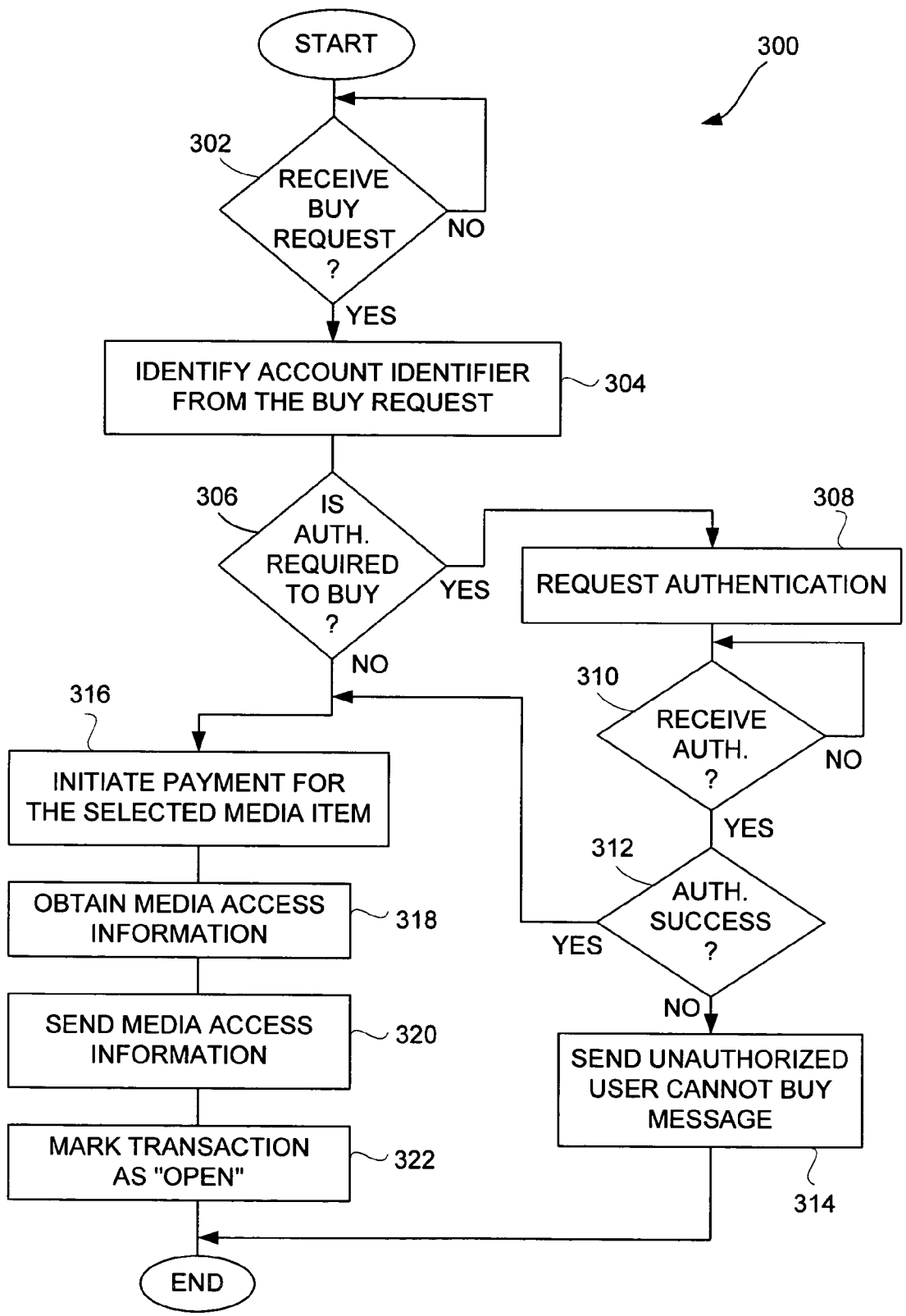
FIG. 3 is flow diagram of media commerce processing according to one embodiment of the invention.

FIG. 3 is flow diagram of media commerce processing 300 according to one embodiment of the invention. The media commerce processing 300 is, for example, performed by a media commerce server, such as the media commerce server 102 illustrated in FIG. 1.

The media commerce processing 300 begins with a decision 302 that determines whether a buy request has been received. When the decision 302 determines that a buy request has not yet been received, the media commerce processing 300 awaits such a request. On the other hand, when the decision 302 determines that a buy request has been received, the media commerce processing proceeds to process the buy request. In this regard, an account identifier is identified 304 from the buy request. Here, the buy request is sent by a client to the media commerce server on behalf of a user of the client (namely, user of a media player operating on the client). In one embodiment, the buy request that is sent to the media commerce server includes not only an account identifier for the user of the client but also at least one media item identifier, media price, and a password token. The password token is random value (e.g., 128 bit string) that is different for every user. The media storage server provides the password token to the client as a result of successful authentication of the user. When the buy request includes a valid password token, the media commerce server can deem the client as properly authenticated.

Next, a decision 306 determines whether authentication is required prior to purchase of the media items. When the decision 306 determines that authentication is required, additional processing can be performed to determine whether such authentication exists. In one embodiment, the user's account or client can configure whether such authentication is required or can be overridden by the user. In one embodiment, the authentication is provided to help protect the user of the client (e.g., media player) from other unauthorized users who might access the media commerce server from the client after the user has successfully been authenticated to the media commerce server. The re-authentication is thus used to confirm that the particular user of the client (e.g., media player) is indeed the authorized user for such a system. In this regard, authentication is requested 308. Then a decision 310 determines whether an authentication response has been received. Once the decision 310 receives the authentication response, a decision 312 determines whether the authentication response is able to successfully authenticate the user. When the decision 312 determines that authentication has not been successful, a message indicating that an unauthorized user cannot buy media items is sent 314 to the client for display to the user.

On the other hand, when the decision 312 determines that authentication has been successful, then additional processing is performed to facilitate the purchase of the selected media item identified in the buy request. In this regard, payment for the selected media item is initiated 316. Here, according to one embodiment, the payment can be made by a credit card, and the initiation of such payment can verify the credit card's existence, but may or may not seek to post the charge at this time. As discussed in more detail below, it may be more efficient and desirable to defer the actual posting of the credit to the credit card until a later time. Nevertheless, after the payment for the selected media item has been initiated 316, media access information is obtained 318. The media access information is information that will enable the client (e.g., media player) to retrieve and then access the media content for the selected media item. The media access information, in one embodiment, includes a URL, a download key, and a security token. Next, the media access information is sent 320. Here, the media access information is sent from the media commerce server to the client, namely, the media player operating on the client. Then, the transaction associated with the purchase of the selected media item is marked 322 and remembered as being "open." At this point, the transaction is not fully completed because the media content for the selected media item has not yet been received by the client. Following the operations 314 and 322, the media commerce processing 300 is complete and ends.

Figure 4:
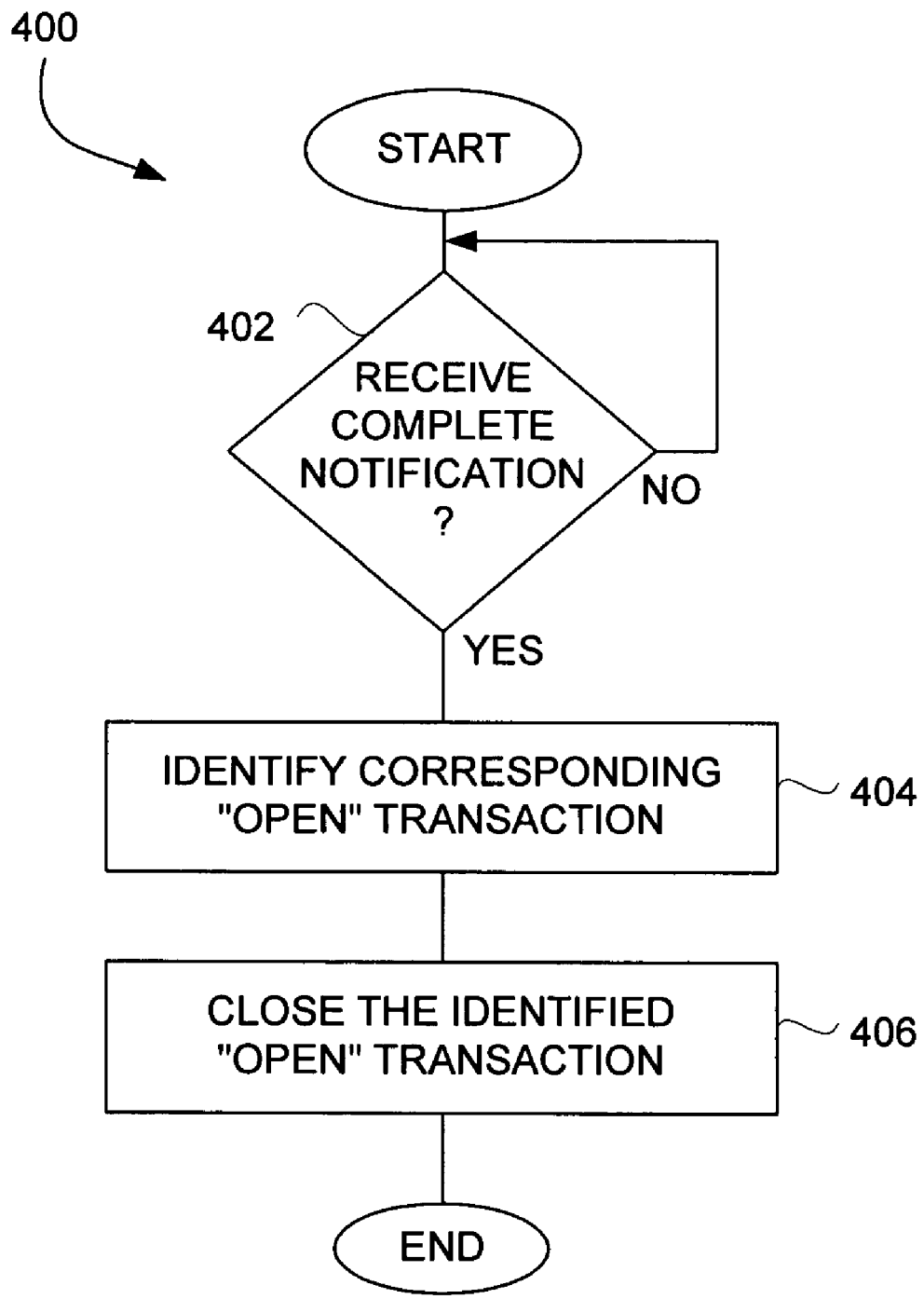
FIG. 4 is a flow diagram of transaction completion processing according to one embodiment of the invention.
Figure 6:
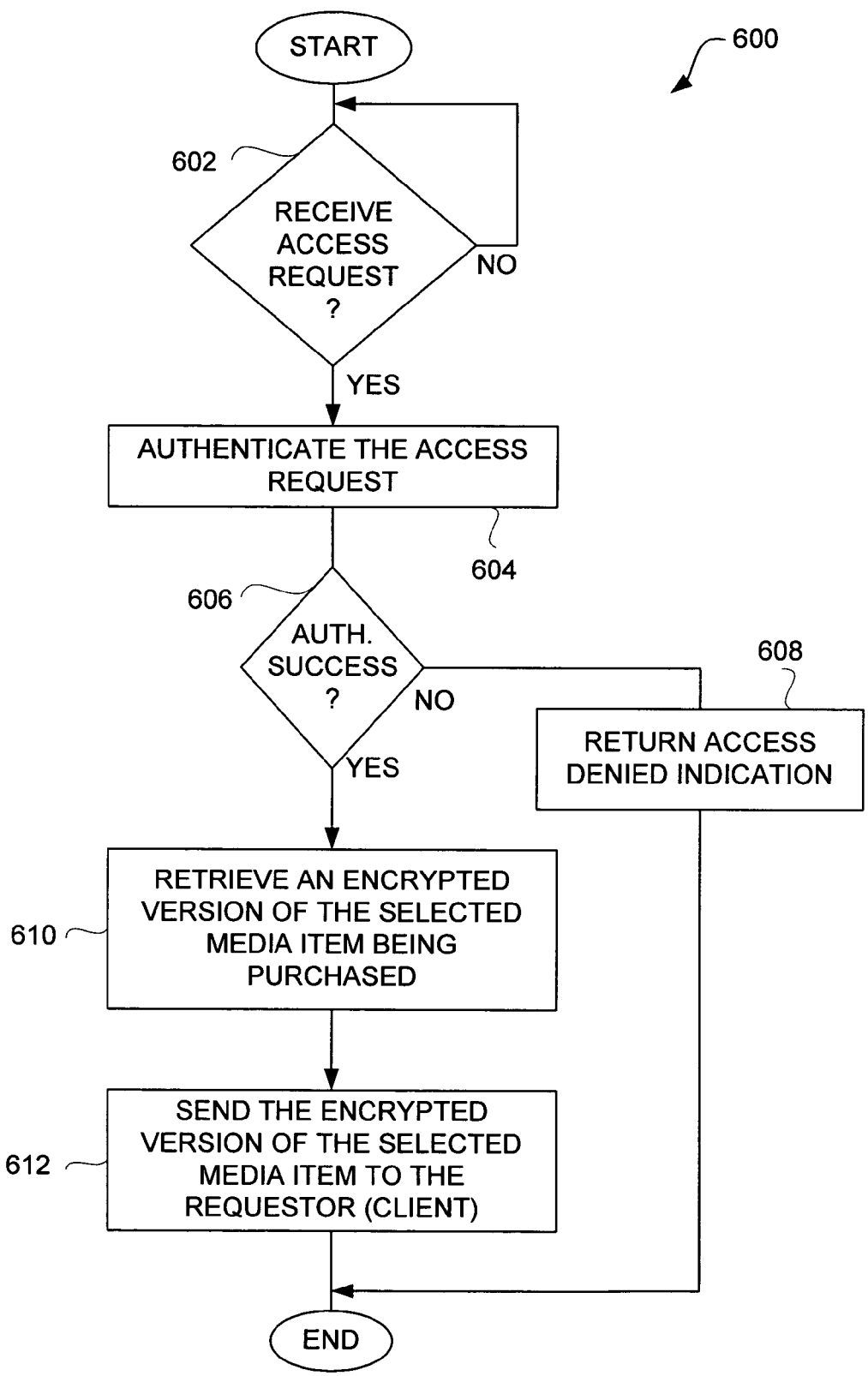
FIG. 6 is a flow diagram of media delivery processing according to one embodiment of the invention.

FIG. 4 is a flow diagram of transaction completion processing 400 according to one embodiment of the invention. The transaction completion processing 400 begins with a decision 402. The decision 402 determines whether a complete notification has been received. Here, a complete notification is a notification provided by a client to the media commerce server that indicates that a previously "open" transaction is now complete. Once the decision 402 determines that a complete notification has been received, the corresponding "open" transaction is identified 404. Then, the identified "open" transaction is closed 406. Once the identified "open" transaction is closed 406, the client is no longer able to download the media content for a purchased media item from a media storage server (FIG. 6). In other words, the transaction is "closed" only after the client has confirmed receipt of the entire media content for the selected media item. By this approach, the client, after having paid for a particular media item, is guaranteed to receive a full copy of the media content even in the event the download process gets interrupted or dropped several times before it is successfully completed.

Another aspect of the invention pertains to processing of online payment for one or more media items being purchased.

Figure 5A:
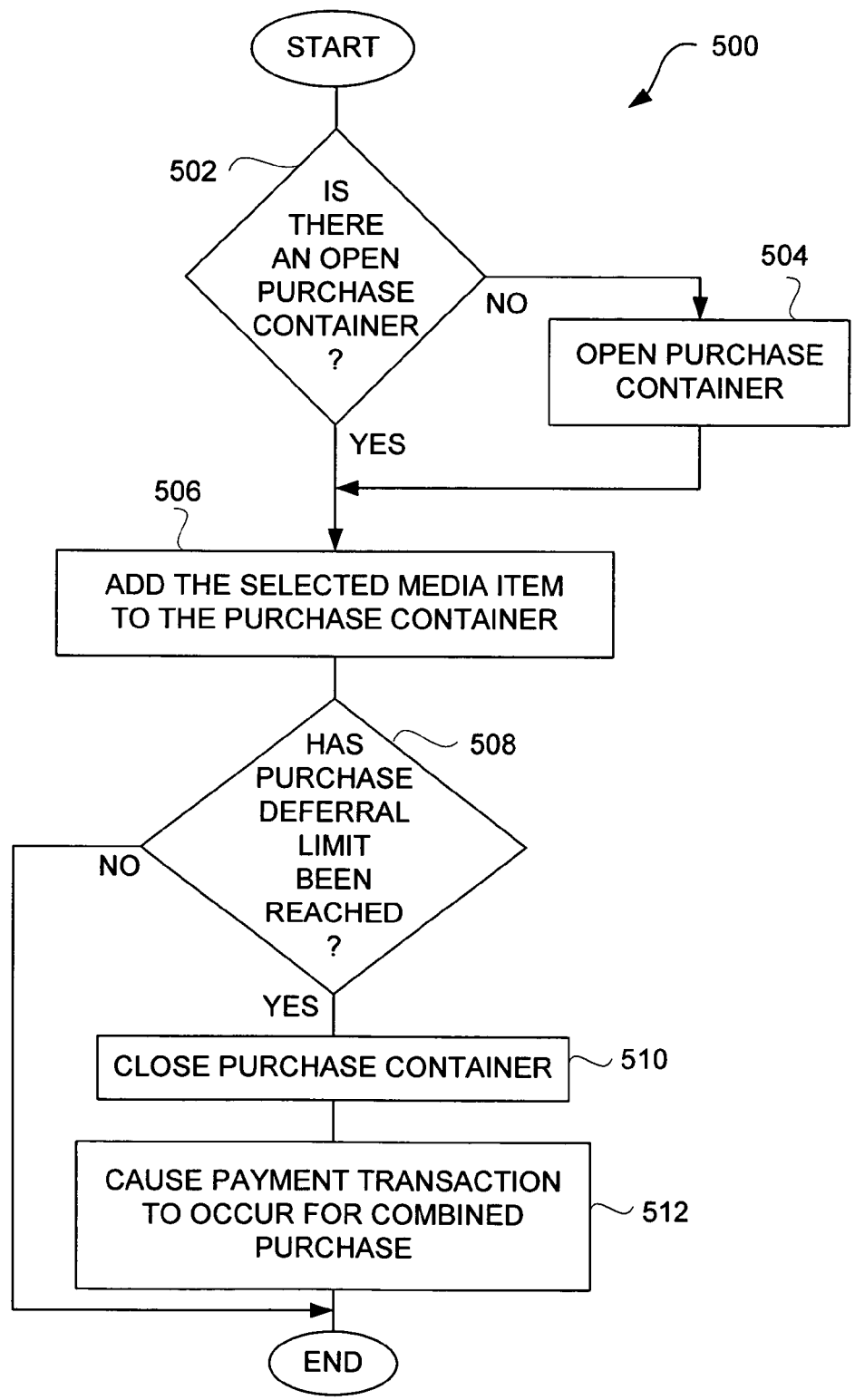
FIG. 5A is a flow diagram of payment processing according to one embodiment of the invention.

FIG. 5A is a flow diagram of payment processing 500 according to one embodiment of the invention. The payment processing 500 is, for example, performed by a server. The server can be a media commerce server, such as the media commerce server 102 illustrated in FIG. 1. In one embodiment, the payment processing 500 is invoked by block 316 illustrated in FIG. 3 which initiates payment for a selected media item that is being purchased. However, the payment processing 500 can also be periodically invoked or invoked on event. The payment processing 500 can also be implemented by one or a plurality of processes.

The payment processing 500 begins with a decision 502 that determines whether there is an open purchase container. Here, a purchase container is a file, folder or other data storage means that provides a temporary holding area for purchases being made with respect to media items. A purchase container can hold information for a number of different purchases for media items. When the decision 502 determines that there is no open purchase container, then a purchase container is opened 504. Then, following the block 504 directly or following the decision 502 when there is already an open purchase container, the selected media item being purchased is added 506 to the purchase container. Here, the purchase container is particular to the user or the user account. At a minimum, for the selected media item, the media purchase container would contain at least a price and a text descriptor for the selected media item. Alternatively, the purchase container could contain a link or reference to such information.

Next, a decision 508 determines whether a purchase deferral limit has been reached. According to the payment processing 500, individual purchases are deferred until the purchase deferral limit has been reached. The purchase deferral limit serves to batch up one or more individual media item purchases for consolidated or block processing. One advantage of the purchase deferral limit is that transaction costs associated with electronic payment systems are reduced. The purchase deferral limits can vary depending upon implementation. As one example, a purchase deferral limit can be based on the number of purchased media items that are in the purchase container. Another example of a purchase deferral limit is time-based, for example, the duration of time since the purchase container was first opened. As another example, the purchase deferral limit can be based upon the aggregate cost of the media items being purchased.

As a more specific example, the purchase deferral limit might use a combination of dollar amount or time limit, whichever occurs first. For example, the dollar amount could be ten US dollars ($10.00), and the time limit could be one day. Then, once the media items within the purchase container have a purchase price that exceeds ten dollars, the payment processing 500 would continue so as to obtain electronic payment for such media items within the purchase container. Also, should the time limit of one day be reached before the dollar limit is reached, then the payment processing 500 would also continue so as to obtain electronic payment for such media items within the purchase container even though the dollar limit was not met.

In any case, when the decision 508 determines that the purchase dollar limit has been reached, then the purchase container is closed 510. Then, the payment processing 500 causes 512 a payment transaction to occur for the combined purchase. In other words, if twelve media items at one dollar cost each were contained within the purchase container, then the payment transaction would cause 512 the total amount of twelve dollars (plus any tax or service charge) to be credited to the electronic payment means associated with the user account of the purchaser. An electronic payment system associated with the electronic payment means would then process the payment transaction and charge the user for the media items being purchased. Given that the media items can be accumulated and processed as a batch in this manner, the ability to reduce transaction costs is achieved. Alternatively, when the decision 508 determines that the purchase deferral limit has not yet been reached, then the operations 510 and 512 are bypassed. Following the operation 512, or its deferral, the payment processing 500 is complete until again invoked.

As an optional feature, the payment processing 500 could be customized on a user (e.g., user account) basis. For example, those users that are deemed "good" users or "creditworthy" users can be given higher purchase deferral limits than other users. The advantage of increased purchase deferral limits is further reduction in transaction costs by additional batching. As one example, a user can be deemed a "good" user if they are a frequent user, such as having already purchased fifty or more media items.

Figure 5B:
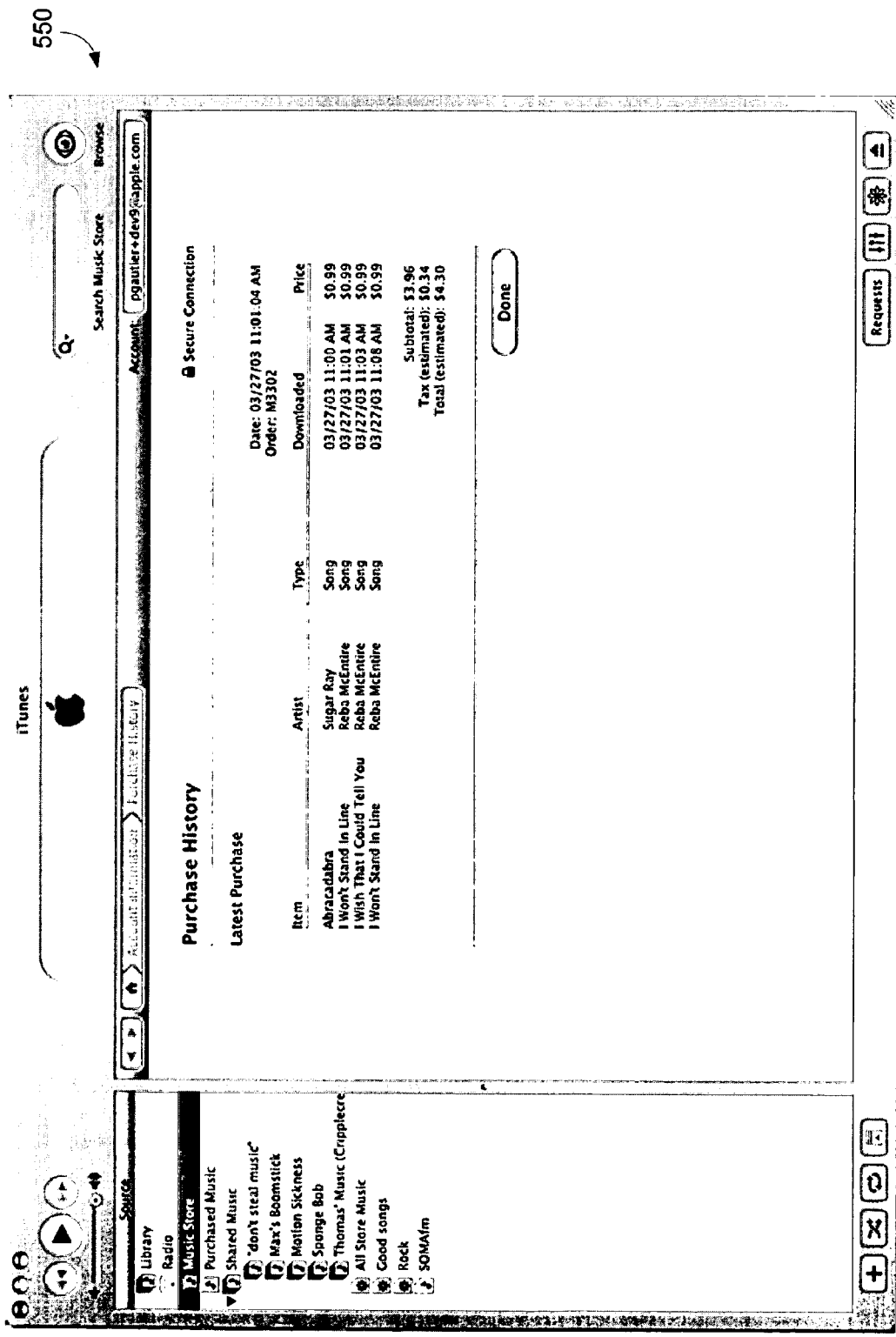
FIG. 5B is a screen shot of a representative application program window that displays purchase history information corresponding to a user's account.

Another aspect of the invention is that a graphical user interface can allow users to access account information. By accessing account information, a user is able to view their current account information and make changes thereto. The account information can include a purchase history for the account. The purchase history can provide the user with a list or report of those media items that have been previously purchased using the user's account. FIG. 5B is a screen shot of a representative application program window 550 that displays purchase history information corresponding to a user's account. As shown in FIG. 5B, the purchase history can include information on the latest purchase, and can include information pertaining to each of the media items purchased. For example, as shown in FIG. 5B, a table of the purchased media items is provided, with the table providing the information on item, artist, type, when downloaded, and price.

FIG. 6 is a flow diagram of media delivery processing 600 according to one embodiment of the invention. The media delivery processing 600 is, for example, performed by the media storage server 110 illustrated in FIG. 1.

The media delivery processing 600 begins with a decision 602. The decision 602 determines whether an access request has been received. An access request is a request from a client to obtain the media content for one or more media items that are stored in a media store (e.g., media store 112) associated with the media storage server (e.g., media storage server 110). In one embodiment, the access request includes at least a URL for the selected media item and a security token from the client. When the decision 602 determines that an access request has been received, then the media delivery processing 600 is effectively invoked. In other words, once an access request has been received, the access request is authenticated 604. The authentication 604 involves the analysis of at least a portion of the access request to authenticate that the request is legitimate and from one that was authorized by the media commerce server. In one embodiment, a hash algorithm can be applied to the URL, a name of the media commerce server, a time of purchase. The result of the hash algorithm is then compared with the security token which is the product of a complimentary hash algorithm performed at the media commerce server. A decision 606 then determines whether the authentication was successful. Here, in one embodiment, if the hashing algorithm approach is used, the result of the hash algorithm should match the security token within some tolerance set by a time limitation. For example, the tolerance due to time might permit the access request to remain authenticate for forty-eight (48) hours after purchase.

When the decision 606 determines that the authentication was not successful, then an access denied indication is returned 608. Here, the access request is denied and the client is so notified. On the other hand, when the decision 606 determines that the authentication was successful, then an encrypted version of the selected media item that has been purchased is retrieved 610. Here, the media storage server would retrieve the encrypted version of the selected media item from the media store. Then, the encrypted version of the selected media item is sent 612 to the requestor (client). In other words, the encrypted version of the selected media item is downloaded to the client that has requested the selected media item. Following the operations 608 and 612, the media delivery processing 600 is complete and ends.

Another aspect of the invention pertains to a graphical user interface suitable for reviewing numerous media items. The graphical user interface is also suitable for previewing or purchasing media items in an on-line manner. The graphical user interface is presented to a user at a client (client machine). In one embodiment, the graphical user interface is presented to the user by an application program that runs on the client, such application program being referred to as a media player (see FIG. 1).

Figure 7A:
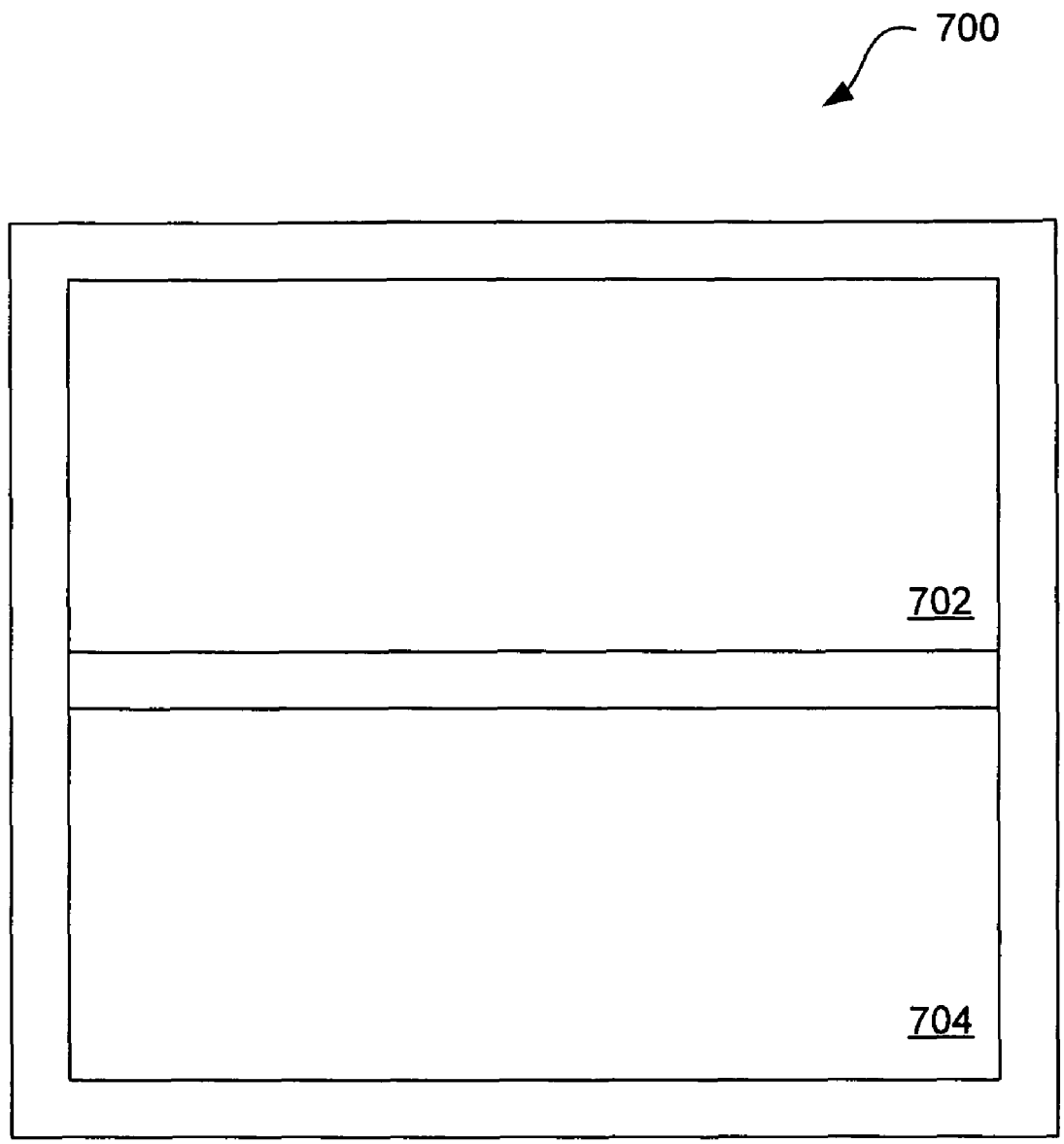
FIG. 7A is a diagram of an application program window according to one embodiment of the invention.

FIG. 7A is a diagram of an application program window 700 according to one embodiment of the invention. The application program window 700 includes a first sub-window 702 and a second sub-window 704. The first sub-window 702 presents information in a browser-like manner, while the second sub-window presents information in an application-like manner. In other words, the application program that is producing the application program window 700 can operate in a local mode manner in which case the content displayed in the application program window 700 would not include the first sub-window 702. However, in a remote mode, when the application program is interacting with a remote server, the application program window 700 can include the first sub-window 702 and the second sub-window 704 as shown in FIG. 7. In such an environment, the first sub-window 702 displays content provided by the remote server in a browser-like manner. This gives the user the feeling of interacting with the remote server in a browser-like style. However, in the second sub-window 704, the user of the application still retains the interface and thus the feel of interacting with the application program as it would as if the application was operating locally (local mode) instead of through interaction with the remote server. However, even in this case, the content for the second sub-window 704 can be retrieved from the remote server.

Figure 7B:
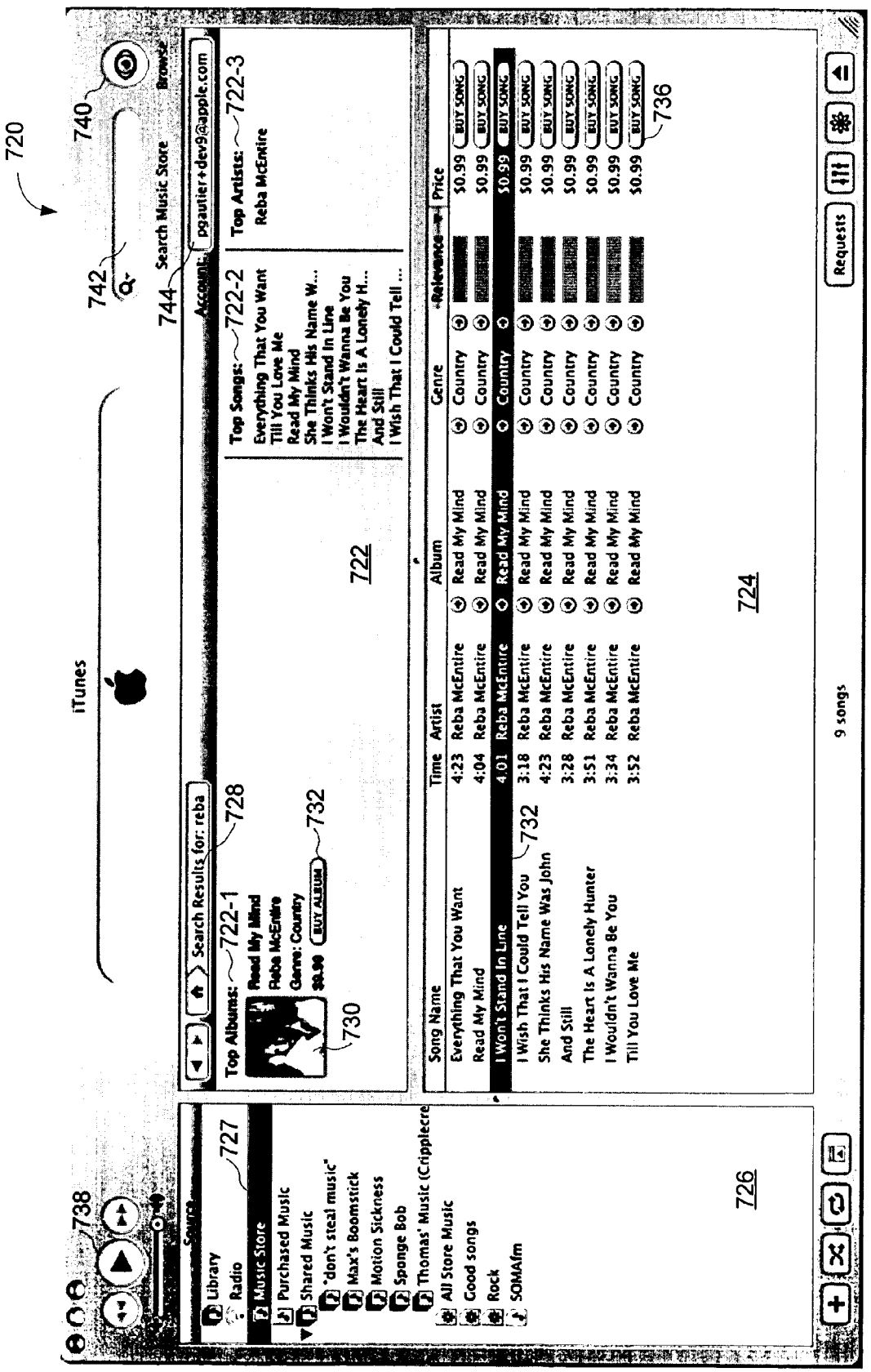
FIG. 7B is a screen shot of a representative application program window according to one embodiment of the invention.

FIG. 7B is a screen shot of a representative application program window 720 according to one embodiment of the invention. The application program window 720 includes a first sub-window 722 and a second sub-window 724 which correlate to the first sub-window 702 and the second sub-window 704 of the application program window 700 shown in FIG. 7A. Additionally, the application program window 720 includes a source window 726. The source window 726 is shown listing a variety of different sources for media content. As shown in FIG. 7B, the source window 726 shows the source being a music store, as shown by highlight bar 727. The music store, in this embodiment, represents a remote media server that contains media (e.g., music) that can be purchased by a user of the application program. Hence, as shown in FIG. 7B, a user has performed a search 728 for music available on the music store by the artist that includes the term "Reba". The results for the search 728 are the content that is provided by the remote media server to the application program. Such content is used to populate the region of the first sub-window 722 and the second sub-window 724. As shown in FIG. 7B, the first sub-window 722 includes three regions, namely, a Top Albums region 722-1, a Top Songs region 722-2, and a Top Artists Region 722-3. The Top Albums region 722-1 references only a single album and thus depicts the album cover art 730 for that album as well as a "buy album" button 732. A user is able to purchase the album indicated in the Top Albums region 722-1 by selecting the corresponding "buy album" button 732. Typically, if the user's account has been so configured, the user can buy the album by the single graphical user interface action of "clicking" on the "buy album" button 732. The Top Songs region 722-2 lists the top songs associated with the artist(s) or album(s) of the Top Albums region 722-1, and the Top Artists region 722-3 indicates the top artist(s) or album(s) associated with the Top Albums region 722-1.

In the second sub-window 724, a list of media items associated with the one or more albums identified by the Top Albums region 722-1 are displayed. In one embodiment, the media items are displayed in a list-like manner that can resemble or mimic the technique utilized to present a list of media items to the user by the application program in cases where the media source is local to the client (i.e., the media items are stored locally). Hence, although the media items specified within the second sub-window 724 are provided by the remote media server, they are presented in a manner that is sophisticated and frequently utilized by the application program in other situations. As shown in FIG. 7B, a particular one of the media items within the list of media items has been selected as shown by a highlight bar 734. Further, any of the media items listed in the second sub-window 724 can be purchased by selection of the associated "buy song" button 736. Again, through a single graphical user interface action, such as "clicking" on the associated "buy song" button 736, the associated media item can be purchased. Further, as shown in FIG. 7B, for a given media item being displayed in the second sub-window 724, characteristic information about the media item can be presented in a column-like fashion. The characteristic information, for example, includes song name, duration of song (time), artist, album, genre, relevance indication, and price.

Still further, the application program window 720 can display other controls or information. For example, the application program window 720 can display a play control 738. Upon selection of the play control 738, a preview audio clip pertaining to a selected one of the media items from the second sub-window 724 is played. Similarly, by "double clicking" on a particular media item in the second sub-window 724, the associated preview audio clip can also be played. Hence, users deciding which media items to purchase are able to easily obtain and hear a preview audio clip. The application program window 720 can also include a browse control 740. Upon selection of the browse control 740, a browse process is performed. The browse process is another way (besides the search process) to identify media items of interest to the user. A search box 742 can also be provided within the application program window 720 to enable a user to perform a further search. Still further, an account area indication 744 provides an indication of whether a user account is active. For example, as shown in FIG. 7B, when an account identifier (such as an email address) for an authorized user is displayed in the account identifier region 744, the application program recognizes that the associated user of the account is logged on (signed in) and their account is active such that the user is able to purchase desired media content from the media store.

Figure 8:
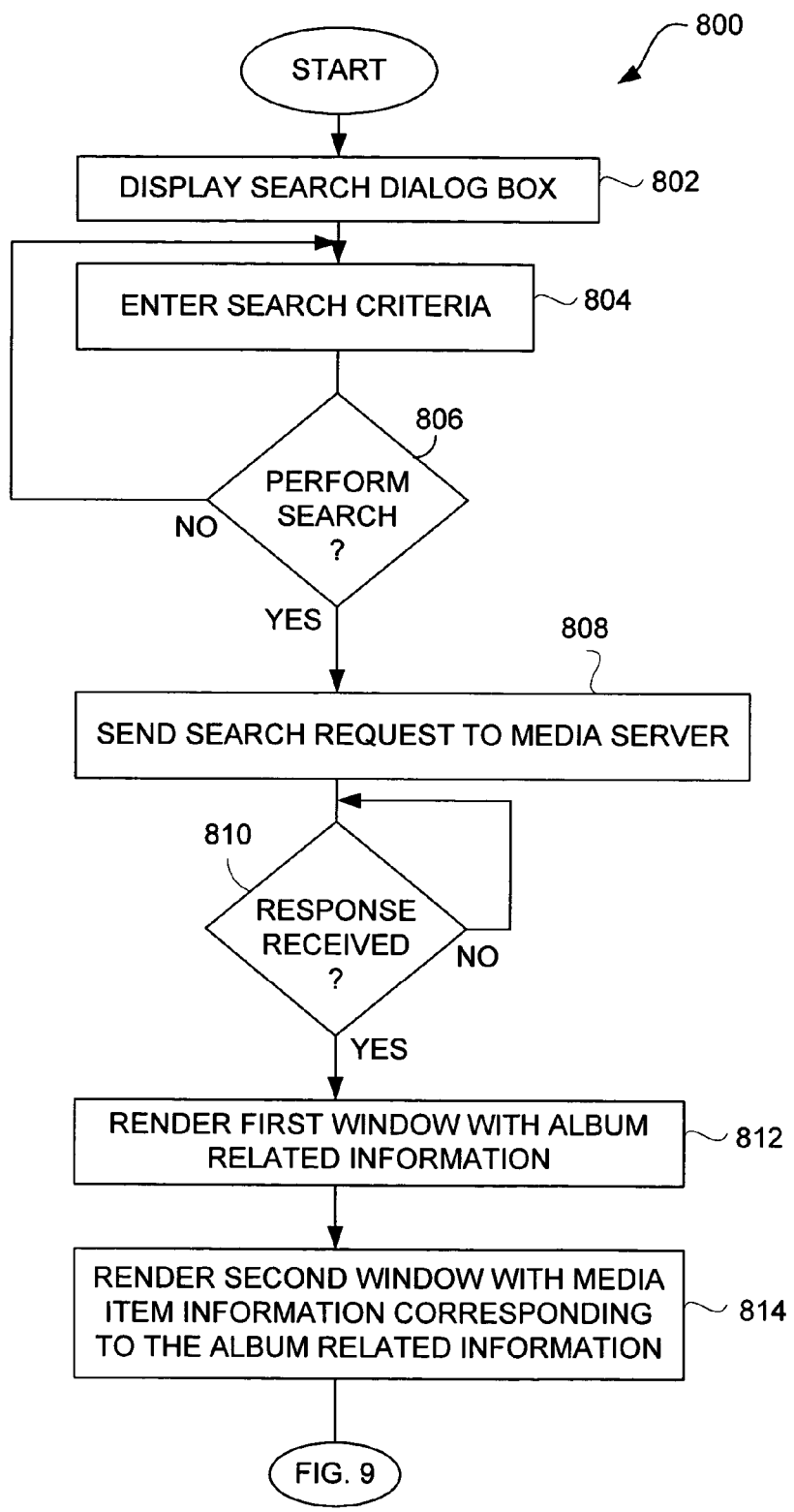
FIG. 8 is a flow diagram of media search processing according to one embodiment of the invention.

FIG. 8 is a flow diagram of media search processing 800 according to one embodiment of the invention. The media search processing 800 is, for example, performed by an application program operating on a client. The application program is, for example, the media player 108 illustrated in FIG. 1.

The media search processing 800 is activated once a user of the application program desires to perform a search in order to identify media content of interest to the user. Hence, a search dialog box is initially displayed 802 to the user. In this embodiment, we assume that the user desires to perform a sophisticated search using field-base restrictions. However, if the user just wants to perform a simple search using merely a term, then the search box 742 shown in FIG. 7B could be utilized. In any case, search criteria is entered 804. Then, a decision 806 determines whether a search is to be performed. When the decision 806 determines that a search is not to be performed, the media search processing 800 returns to repeat the operation 804 and subsequent operations so that the search criteria can be changed. However, once the decision 806 determines that a search is to be performed, then a search request is sent 808 to a remote media server. Here, in one example, the remote media server is the media commerce server 102 illustrated in FIG. 1. The search request is a request to the remote media server to perform a search in accordance with the search criteria. Here, the remote media server includes at least information (e.g., metadata) for a large number of media items that are available to be purchased from the remote media server, though the content of the media items that are purchased may be acquired at the client via download with respect to another remote server, such as the media storage server 110.

After the search request has been sent 808 to the remote media server, a decision 810 determines whether a response has been received. Here, the media search processing 800 waits until a response to the search request has been received back at the application program. Once the decision 810 determines that a response has been received, an application program window is produced or rendered by the application program. More specifically, a first window (e.g., first sub-window) of the application program window is rendered 812 with album related information. Additionally, a second window (e.g., second sub-window) of the application program window is rendered 814 so as to display media item information corresponding to the album related information. In one embodiment, the media item information can be displayed in the second window in a list format or in a row and column format.

For example, the search criteria of "Reba" and such was sent to the remote media server. The remote media server returned the album related information that is depicted in the first sub-window 722 illustrated in FIG. 7B, and the corresponding media item information depicted in the second sub-window 724 shown in FIG. 7B.

In one embodiment, the response from the remote media server is a list media items (e.g., tracks) that result from a search request. The second window displays media item information for the media items (e.g., tracks) on the list of media items. The first window can display album related information for the most relevant media items (e.g., tracks) on the list of media items.

At this point, the media search processing 800 has received search criteria and performed a search at a media server, and then returned results that are displayed in the first window and the second window. At this point, and using graphical user interface components that are also provided within the first window and the second window, the user of the application program is able to further interact with the graphical user interface to perform other operations from the results view such as shown in FIG. 7B.

Figure 9:
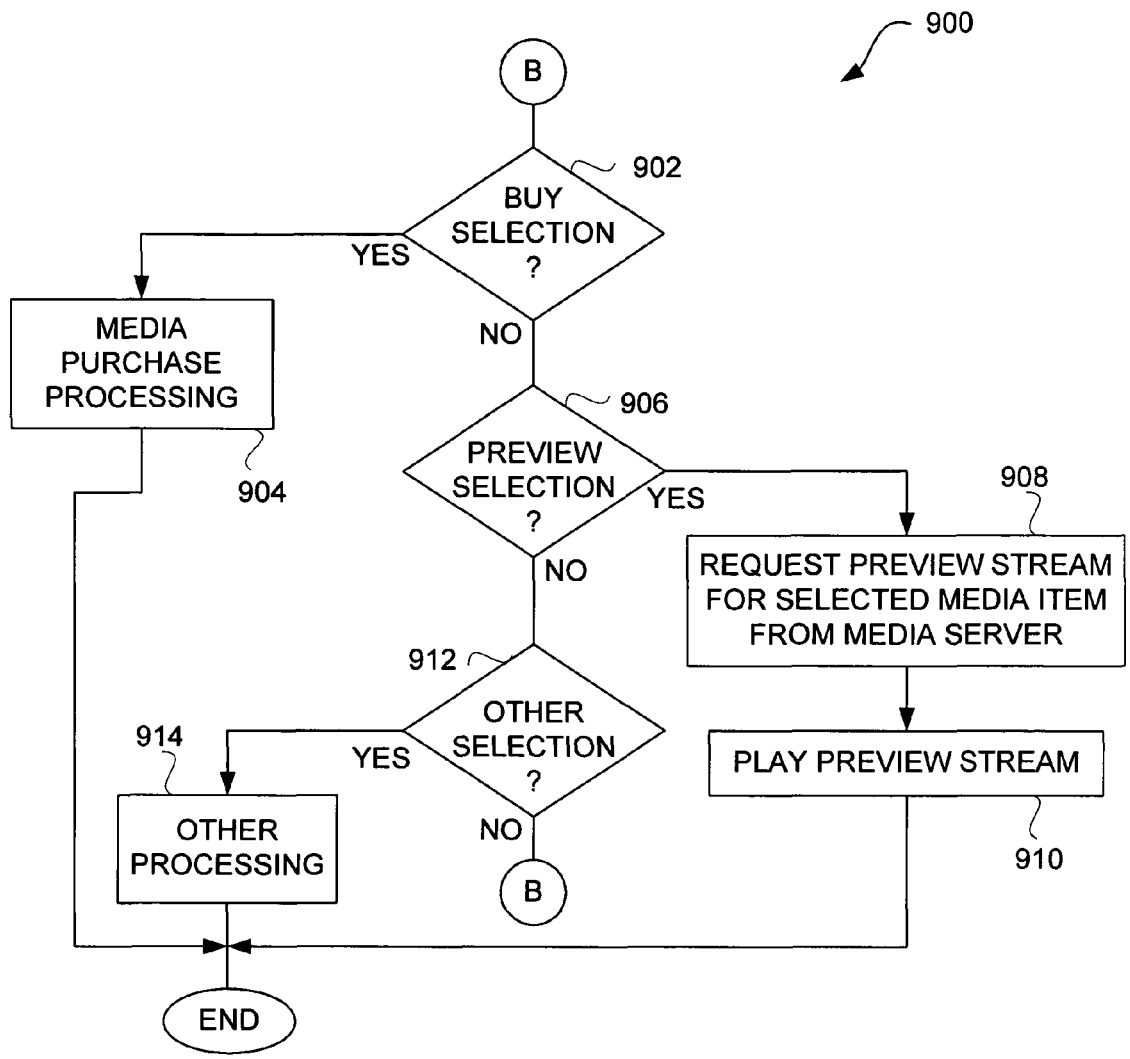
FIG. 9 is a flow diagram of additional processing according to one embodiment of the invention.

FIG. 9 is a flow diagram of additional processing 900 according to one embodiment of the invention. The additional processing 900 is processing that can be invoked and performed by the application program following either the media search processing shown in FIG. 8 or the media browse processing discussed below with reference to FIGS. 12A and 12B.

As shown in FIG. 9, a decision 902 determines whether a buy selection has been made. For example, with respect to FIG. 7B, whether the user selected a "buy album" button 732 or a "buy song" button 736. When the decision 902 determines that a buy selection has been made, then media purchase processing 904 is performed. As an example, the media purchase processing 904 can be the media purchase processing 200 shown in FIGS. 2A and 2B. Alternatively, when the decision 902 determines that a buy selection has not been made, then a decision 906 determines whether a preview selection has been made. For example, as noted above with respect to FIG. 7B, a preview can be selected through use of a preview control 738 or by "double-clicking" on a particular media item listed within the second sub-window 724. In any case, when the decision 906 determines that a preview selection has been made, then a preview stream for the selected media item is requested 908 from the remote media server. Here, the application program does not locally store the media content needed to preview media items. Hence, to preview a particular media item, the application program sends a preview request to the remote media server to instruct the media server to stream the preview for the selected media item to the particular application program. Once the stream for the preview request has been initiated by the remote media server, the preview stream is played 901 at the application program, thereby permitting the user of the application program to hear the audio associated with the preview clip for the selected media item.

On the other hand, when the decision 906 determines that a preview selection has not been made, then a decision 912 determines whether any of a variety of other selections have been made. The user is able to interact with an application program window in a variety of different ways beyond search, buy and preview. For example, the user could interact with the graphical user interface to sort the media items in the second sub-window 724 in a different manner, or might request a browse operation using the browse control 740, might proceed to a home page for the music store, etc. These other types of processing can be performed at 914 when one or more such other selections are determined by the decision 912 to have been made. If the decision 912 determines that there are no other selections, then the media search processing 900 can return to repeat the decision 902 and subsequent operations so that these additional operations or functionality that can be utilized from the application program window are available. Following the operations 904, 910 and 914, the media search processing 900 is complete and ends.

Still another aspect of the invention pertains to a graphical user interface suitable for efficiently browsing through numerous media items. The graphical user interface is also suitable for purchasing media items in an on-line manner. The graphical user interface is presented to a user at a client (client machine). In one embodiment, the graphical user interface is presented to the user by an application program that runs on the client, such application program being referred to as a media player (see FIG. 1).

Figure 10:
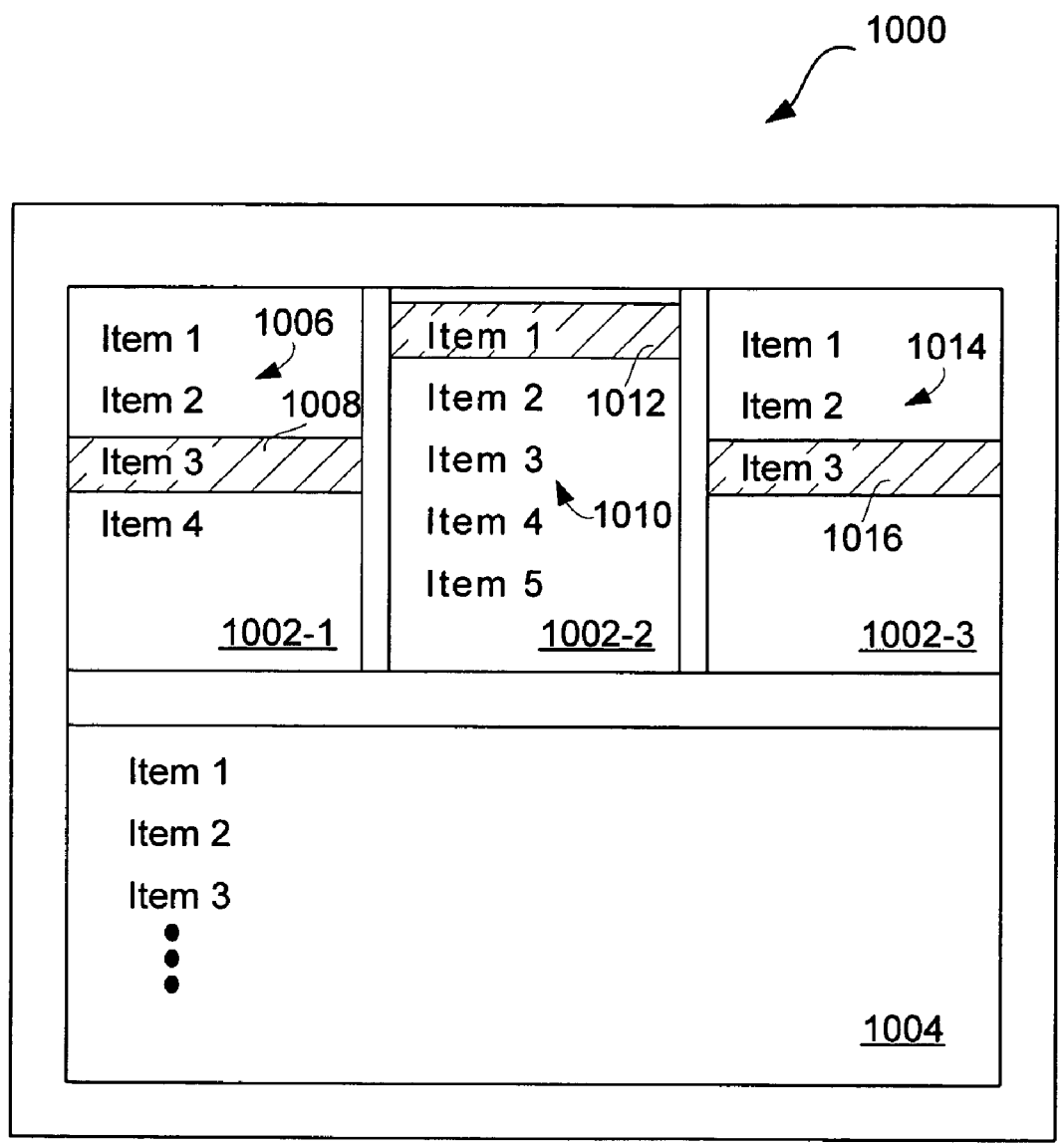
FIG. 10 is a diagram of an application program window according to one embodiment of the invention.

FIG. 10 is a diagram of an application program window 1000 according to one embodiment of the invention. The application program window 1000 is a graphical user interface. A user can interact with the graphical user interface to browse media items that are available on a remote server for purchase or preview. The remote server can, for example, include one or both of the media commerce server 102 and the media storage server 110 shown in FIG. 1.

The application program window 1000 includes a first sub-window 1002 and a second sub-window 1004. The first sub-window 1002 includes a first region 1002-1, a second region 1002-2, and a third region 1002-3. As shown in FIG. 10, the first region 1002-1 includes a first list 1006 of items. A user would interact with the first region 1002-1 to select one of the items in the first list 1006 of items. The selected item can then be highlighted 1008 (or otherwise visually distinguished). Once a particular item within the first list 1006 is selected and thus highlighted 1008, a request is sent to the remote server to identify the appropriate items for a second list 1010 of items that are displayed in the second region 1002-2. In other words, the remote server responds to the request with the items for the second list 1010 that are to be displayed within the second region 1002-2. Again, a user can interact with the second region 1002-2 to select one of the items within the second list 1010. The selected item can then be highlighted 1012 (or otherwise visually distinguished). Then, the selected and highlighted item 1012 causes a request to be sent to the remote server to obtain items that are associated with the selected and highlighted item 1012. The response from the remote server is one or more items that are displayed in a third list 1014 within the third region 1002-3. A user can interact with the third region 1002-3 to select one of the items within the third list 1014. The selected item can then be highlighted 1016 (or otherwise visually distinguished).

After one of the items within the third list 1014 has been selected and highlighted 1016, still another request can be sent to the remote server to obtain items that are associated with the selected and highlighted item 1016. In response to the request, the remote server supplies one or more items that are displayed in the second sub-window 1004. These items can be displayed in a variety of different ways and generally also include descriptive or characteristic information for each of the items. The one or more items can be displayed as a list or as a row and column (e.g., table) format. In one embodiment, the second sub-window 1004 is larger than each of the regions of the first sub-window 1002, and thus the second sub-window 1004 has additional display area for information pertaining to each of the media items being displayed therein. In one embodiment, the items being displayed in the second sub-window 1004 are media items. These media items can, for example, be songs, videos or images that can be previewed or purchased.

Figure 11A:
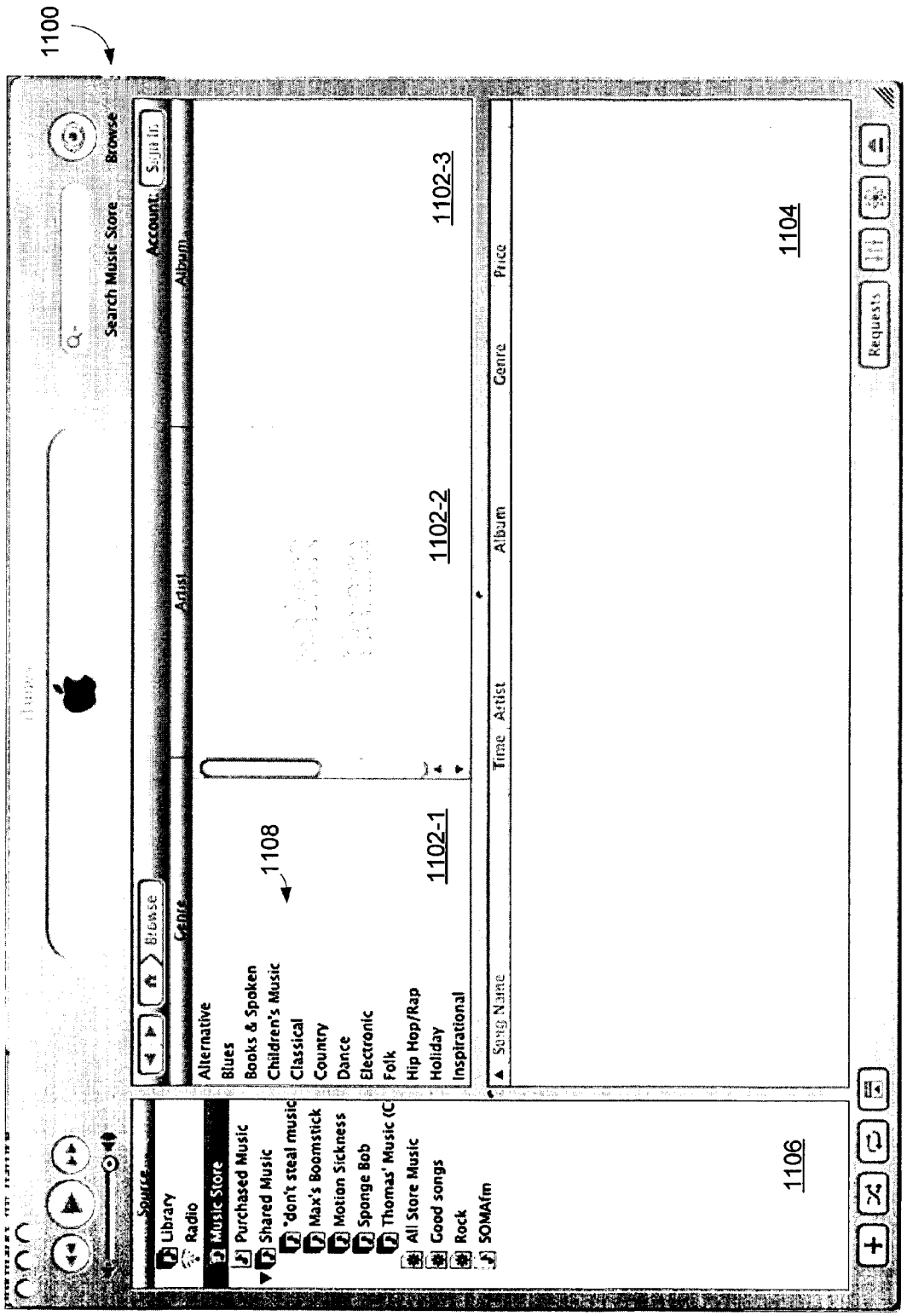
FIGS. 11A-11C are screen shots illustrating successive views of a browse feature according to one embodiment of the invention.
Figure 11B:
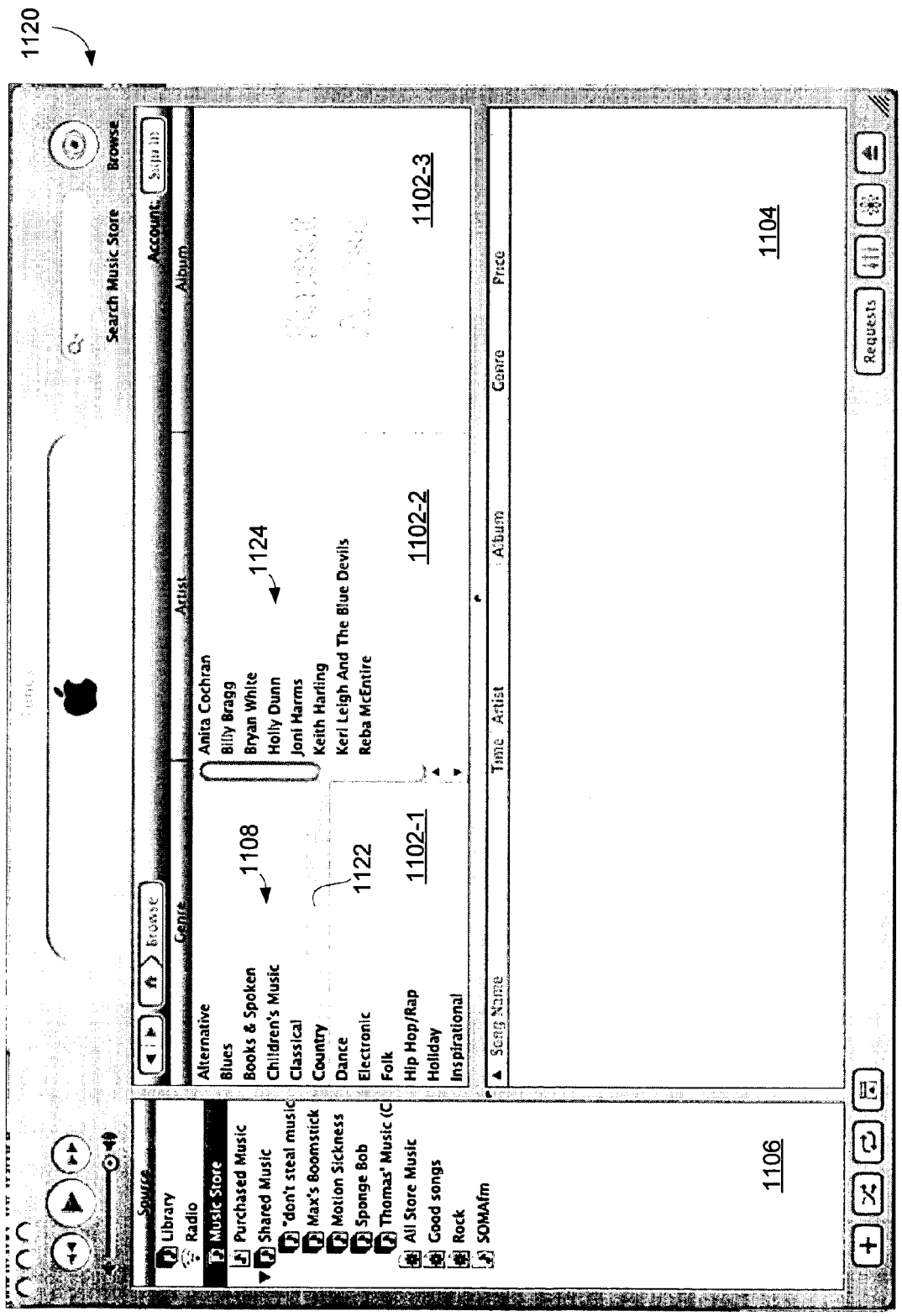
Figure 11C:
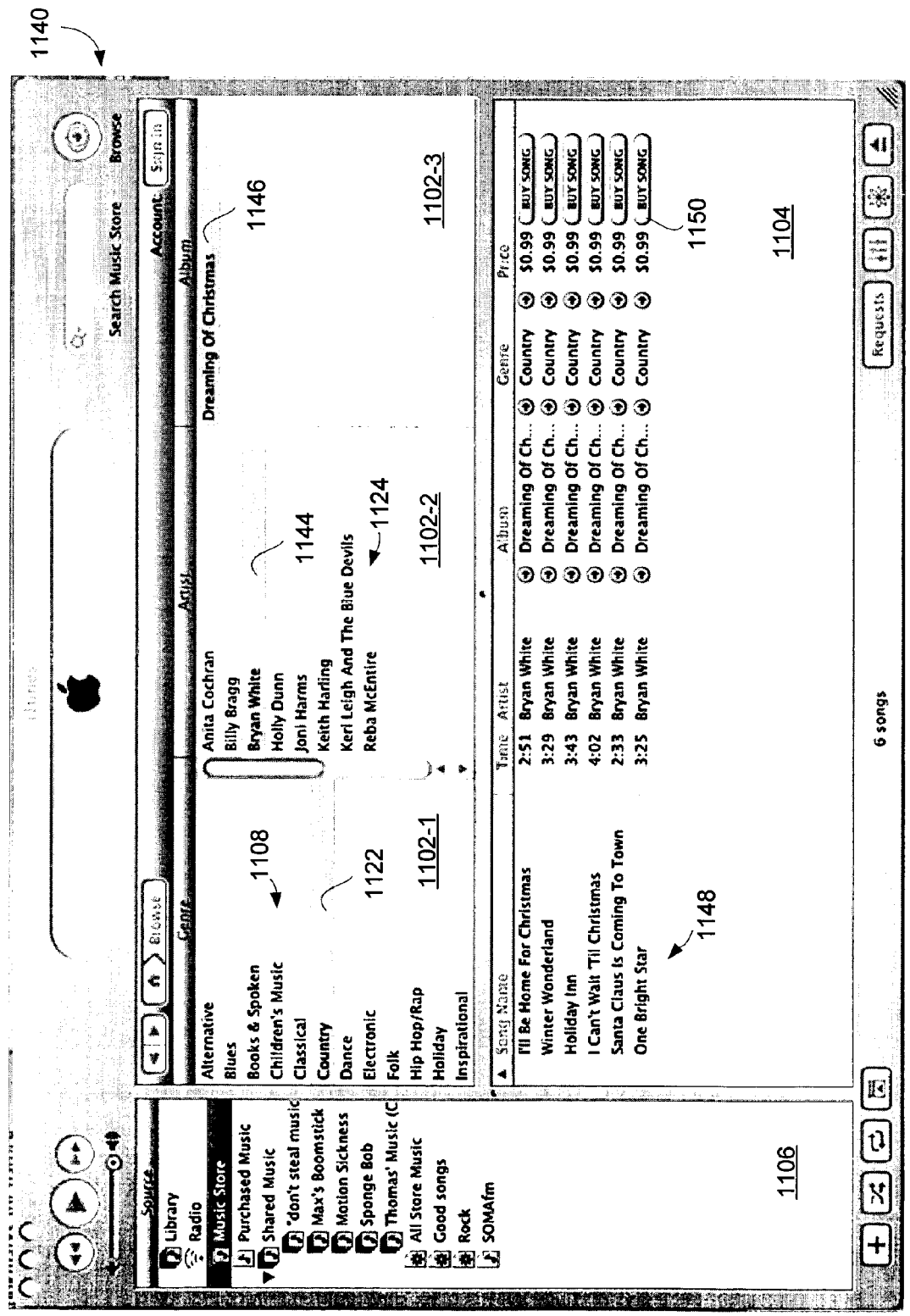

FIGS. 11A-11C are screen shots illustrating successive views of a browse feature according to one embodiment of the invention.

FIG. 11A is a screen shot of an application program window 1100 according to one embodiment of the invention. The application program window 1100 includes a first sub-window 1102, a second sub-window 1104, and a third sub-window 1106. The first sub-window 1102 includes a first region 1102-1, a second region 1102-2 and a third region 1102-3. As shown in FIG. 11A, the first region 1102-1 is shown displaying a list of available genre (genre list) 1108. The second area 1102-2 displays the text "select genre" which is intended to inform the user to select one of the items within the genre list 1108 being displayed in the first region 1102-1.

FIG. 11B is a screen shot of an application program window 1120 after a user has selected one of the items within the genre list 1108 being displayed in the first region 1102-1. A selected item 1122 from the genre list 1108 can be highlighted as shown in FIG. 11B. Once a user has selected one of the items within the list 1108 (selected genre), the second region 1102-2 can be populated with a list of artists (artist list) 1124 that are associated with the selected genre from the genre list 1108. The artist list 1124 is provided by the remote server to the application program that presents the application program window 1120. The third region 1102-3 displays the message "select artist" to encourage the user to select one of the artists from the artist list 1124 being displayed in the second region 1102-2.

FIG. 11C is a screen shot of an application program window 1140 after the user has selected one of the available artists from the artist list 1124 of the second region 1102-2. When a user has selected one of the artists (selected artist) 1144 from the artist list 1124 of the second region 1102-2, the selected artist 1144 can be illustrated in a highlighted manner. Then, the third region 1102-3 displays one or more albums in an album list 1146. The albums within the album list 1146 are those albums that are the product of the selected artist 1144. The album list 1146 is provided by the remote server. When the album list 1146 has a plurality of items, the user would select one of the items. However, as shown in FIG. 11C, the album list 1146 has but a single item (album). Hence, the single item is deemed selected. Once an item in the album list 1146 is selected, the second sub-window 1104 can be populated with a music list 1148 of the songs that are on the selected album. The music list 1148 can display descriptive information for each of the songs. For example, as shown in FIG. 11C, the song list 1148 is presented in a row and column (e.g., table) format with each row pertaining to a different song on the selected album, and with the columns pertaining to song name, title, artist, album, genre, and price. Further, within the price column, each of the rows can include a "buy song" button 1150 that allows for ease of purchase of the particular song by the user. In one embodiment, the price is a fixed price per song/track. For example, the fixed price could be $0.99 per song.

Figure 12A:
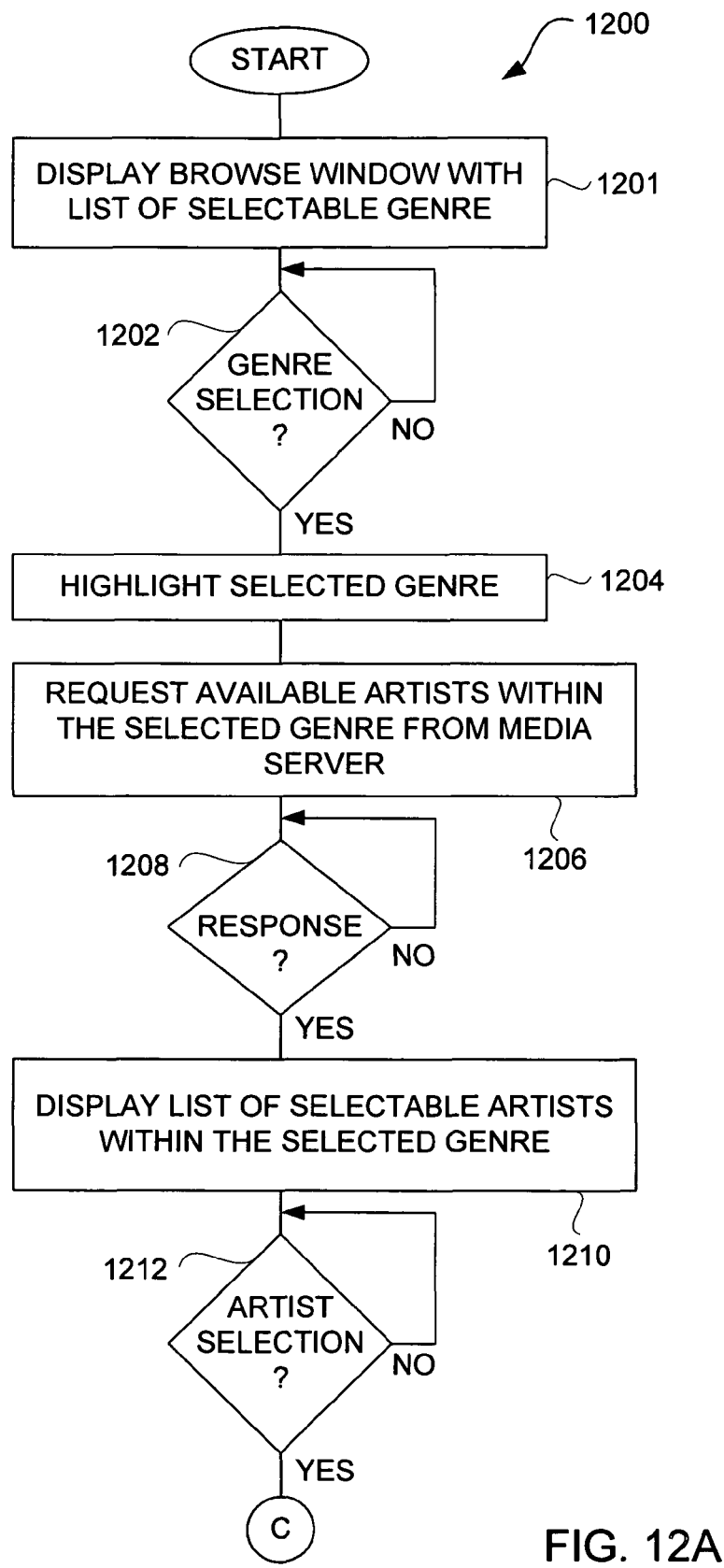
FIGS. 12A and 12B are flow diagrams of media browse processing according to one embodiment of the invention.
Figure 12B:
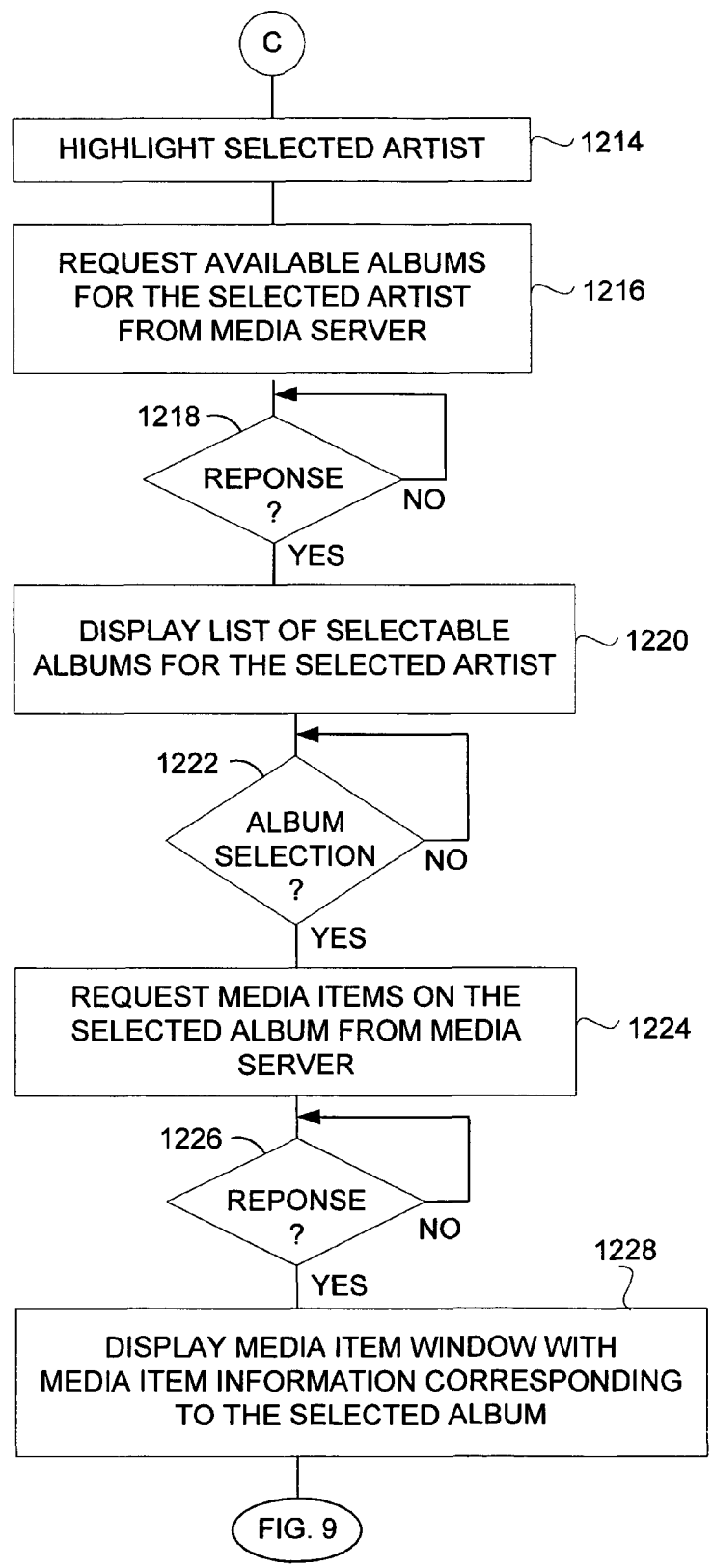

FIGS. 12A and 12B are flow diagrams of media browse processing 1200 according to one embodiment of the invention. The media browse processing 1200 is, for example, performed by a media player, such as the media player 108 operating on the client 104 illustrated in FIG. 1. The media player also communicates with a remote server (media server) to obtain information pertaining to available media content that can be viewed, presented, previewed or purchased. The remote server can, for example, include one or both of the media commerce server 102 and the media storage server 110 shown in FIG. 1.

The media browse processing 1200 initially displays 1201 a browse window with a list of selectable genre. The genre within the list is provided by the remote server to the application program that produces the browse window. As an example, the browse window can pertain to the application program window 1000, 1100, 1120 or 1140 shown in FIGS. 10 and 11A-11C.

Next, a decision 1202 determines whether a genre selection has been made. When the decision 1202 determines that a genre selection has not yet been made, the media browse processing 1200 awaits for the user to make such a selection. Once the decision 1202 determines that a genre selection has been made, then the selected genre is highlighted 1204. In addition, those available artists within the selected genre are requested 1206 from the remote server.

A decision 1208 then determines whether a response has been received from the remote server. When the decision 1208 determines that a response has not yet been received, the media browse processing 1200 awaits such a response. Once the decision 1208 determines that a response has been received, a list of selectable artists that are within the selected genre is displayed 1210. In other words, the response from the remote server identifies those selectable artists that are within the selected genre. The selectable artists are then displayed 1210 in the list of selectable artists. In one embodiment, while displaying the list of selectable artists, the list of selectable genre is also still displayed.

After the list of selectable artists is displayed 1210, a decision 1212 determines whether an artist selection has been made. Here, the user is able to interact with the browse window to select an artist from the list of selectable artists that is being displayed 1210. When the decision 1212 determines that an artist selection has not been made, the media browse processing 1200 awaits such a selection. Once the decision 1212 determines that an artist selection has been made, the selected artist is highlighted 1214. Then, available albums for the selected artist are requested 1216 from the remote server (media server). A decision 1218 then determines whether a response to the request has been received from the remote server. When the decision 1218 determines that a response has not yet been received, the media browse processing 1200 awaits such a response. Once the decision 1218 determines that a response has been received, a list of selectable albums for the selected artist is displayed 1220. The response from the media server in this case includes the selectable albums that were produced by the selected artist. In one embodiment, the list of selectable albums can be displayed 1220 while the list of selectable artists and the list of selectable genre are also concurrently being displayed.

After the list of selectable albums is displayed 1220, a decision 1222 determines whether an album selection has been made. When the decision 1222 determines that an album selection has not yet been made, the media browse processing 1200 awaits such a selection. When the decision 1222 determines that an album selection has been made, then media items that are on the selected album are requested 1224 from the media server. A decision 1226 then determines whether a response to the request has been received. When the decision 1226 determines that a response has not yet been received, then the media browse processing 1200 awaits such a response. When the decision 1226 determines that a response has been received, then a media item window is displayed 1228 having media item information corresponding to the selected album. Typically, the media item window would display a list of media items that correspond to the selected album. For example, the media items could be songs that are present on the selected album. For example, as shown in FIG. 11C, the second sub-window 1104 can pertain to the media item window and display a list of media items (songs) together with other descriptive or characteristic information pertaining to the media items.

Following the operation 1228, the user can interact with the media item window to preview, sort, and purchase any of the media items. Such additional operations can be performed, in one embodiment, as shown in FIG. 9 discussed above.

Furthermore, the graphical user interface discussed above with respect to FIGS. 10-12B was primarily discussed in terms of musical songs. However, as previously noted, the graphical user interface is generally applicable to browsing media items. For example, the media items can be video (e.g., DVDs), audio books or a grouping (e.g., charts). For example, in the case of audio books, the graphical user interface might permit the user to first select "Audio books," then select a category, and then select an author. Once an author is selected, a list of available audio books could be displayed in another window, from which the user could preview and/or buy any of the listed audio books. For example, with respect to the application program window 1000 shown in FIG. 10, in one embodiment, the first region 1002-1 can display a list of genre in which "audio books" is included as one genre, the second region 1002-2 can display a list of categories of audio books (arts & entertainment, sports, history, etc.), and the third region 1002-3 can list the authors of having audio books in the selected category.

As another example, when the media items pertain to a grouping, the graphical user interface can enable a user to browse the groupings. In one implementation, the groupings can pertain to charts. For example, the graphical user interface might permit the user to first select "charts," then select a particular chart, and then select a particular year for that chart. Once a year is selected, a list of media items (e.g., songs) associated with the particular chart for the particular year can be displayed in another window, from which the user could preview and/or buy any of the listed media items. For example, with respect to the application program window 1000 shown in FIG. 10, in one embodiment, the first region 1002-1 can display a list of genre in which "charts" is included as one genre, the second region 1002-2 can display a list of charts (e.g., Billboard Hot 100, Rick Dees Weekly Top 40 Chart, etc.), and the third region 1002-3 can list the years for the selected chart.

One genre of music is "classical." The graphical user interface discussed above with respect to FIGS. 10-12B can also be used to browse classical music. For example, with respect to the application program window 1000 shown in FIG. 10, in one embodiment, the first region 1002-1 can display a list of genre in which "classical" is included as one genre, the second region 1002-2 can display a list of artists of classical music (e.g., Mozart, Beethoven, etc.), and the third region 1002-3 can list the albums (CDs) of the selected artist. The one or more items that are displayed in the second sub-window 1004 can be individual media items (e.g., tracks) or a grouping of media items (e.g., a group of tracks). For example, a media item "Piano Concerto No. 19" can be displayed in a row within the second sub-window 1004. However, such a media item can represent a grouping of different movements, tempos, arrangements, etc., such as "Piano Concerto No. 19 In F, KV 459: Allegro Vivace," "Piano Concerto No. 19 In F, KV 459: Allegretto," and "Piano Concerto No. 19 In F, KV 459: Allegro Assai." The grouping can be displayed initially in a single row in a condensed fashion. In one embodiment, besides a descriptor for the grouping, an indicator (e.g., symbol or icon) can be displayed at each row in the second sub-window 1004 in which the descriptor represents a grouping. The indicator can also be user-selectable so that the user can cause the single row to expand to a plurality of rows as needed to display information on the individual media items (e.g., tracks) of the grouping. The indicator can thus permit the user to view a grouping of media items in a compressed or an expanded fashion.

Figure 13A:
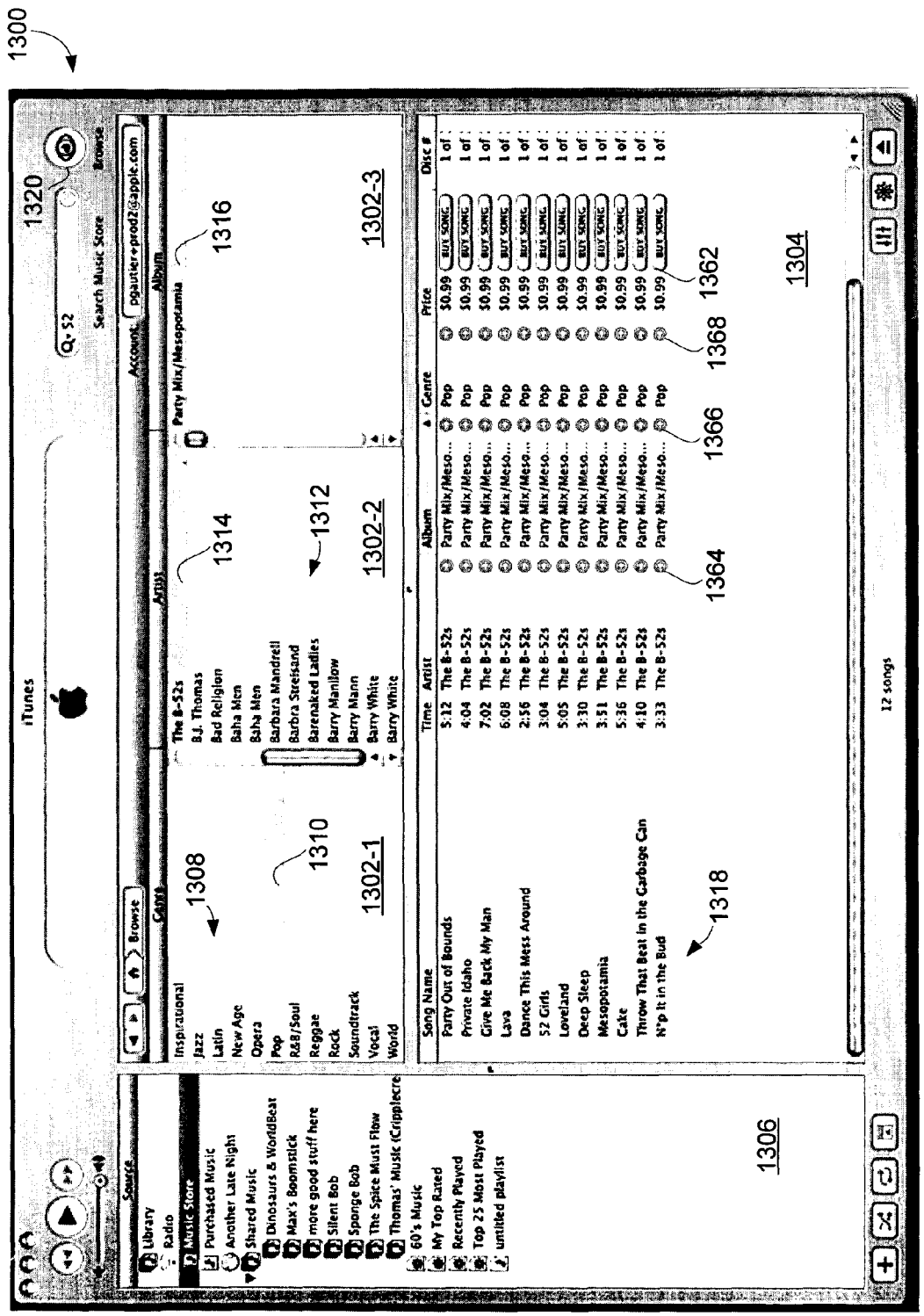
FIGS. 13A-13B are screen shots illustrating additional features of a graphical user interface according to other embodiments of the invention.
Figure 13B:
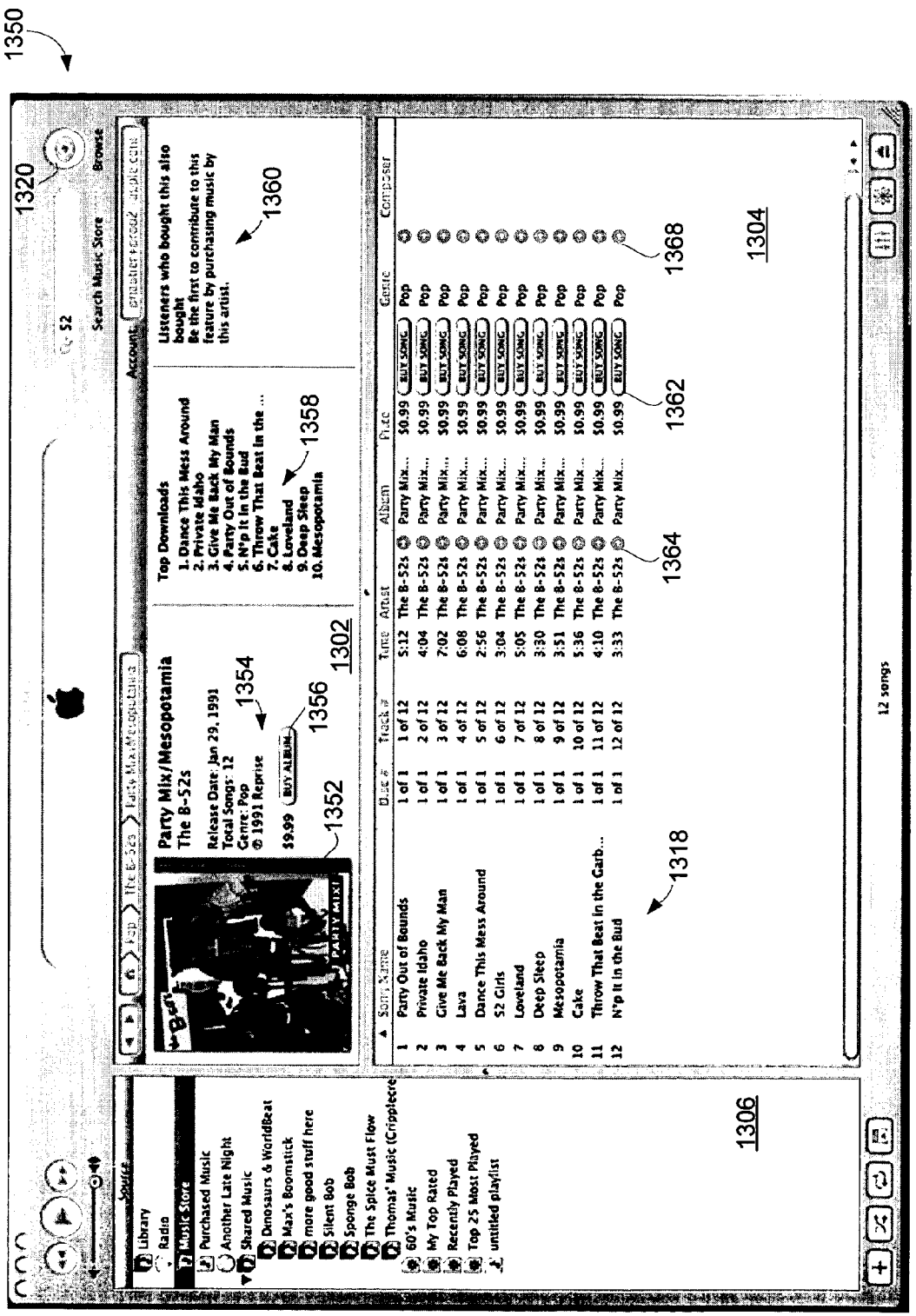

FIGS. 13A-13B are screen shots illustrating additional features of a graphical user interface according to other embodiments of the invention. The screen shot shown in FIG. 13A is similar to that shown in FIG. 11C, and can be arrived at by similar processing.

FIG. 13A is a screen shot of an application program window 1300 according to another embodiment of the invention. The application program window 1300 includes a first sub-window 1302, a second sub-window 1304, and a third sub-window 1306. The first sub-window 1302 includes a first region 1302-1, a second region 1302-2 and a third region 1302-3. As shown in FIG. 13A, the first region 1302-1 is shown displaying a list of available genre (genre list) 1308. After user has selected one of the items within the genre list 1308, the selected item 1310 can be indicated by highlighting such as shown in FIG. 13A. The second area 1302-2 displays a list of artists (artist list) 1312 that are associated with the selected genre from the genre list 1308. Then, after the user has selected one of the available artists from the artist list 1312 of the second region 1302-2, the selected artist 1314 can be illustrated in a highlighted manner. The third region 1302-3 displays one or more albums in an albums list 1316. When the albums list 1316 has a plurality of items, the user would select one of the items. However, as shown in FIG. 13A, the albums list 1316 has but a single item (album). Hence, the single item is deemed selected. Once an item in the album list 1316 is selected, the second sub-window 1304 can be populated with a song list 1318 of the songs that are on the selected album. The song list 1318 can display descriptive information for each of the songs. For example, as shown in FIG. 13A, the song list 1318 is presented in a row and column (e.g., table) format with each row pertaining to a different song on the selected album, and with the columns pertaining to song name, title, artist, album, genre, and price.

At this point, the user has completed the browse operation and can then interact with the application program window 1300 in a variety of different ways. One way that the user can interact with the application program window 1300 is through use of a toggle control 1320. The toggle control 1320 is a button, image or other user interface control that is selectable by a user. The toggle control 1320, when selected, toggles the graphical user interface from the browse interface in the first sub-window 1302 to an informational mode.

FIG. 13B is a representative application program window 1350 that is displayed after the user interacts with the browse control 1320 shown in FIG. 13A. In such case, the first sub-window 1302 is altered to contain descriptive information for associated media items. In particular, for the example shown in FIG. 13B, the first sub-window 1302 contains an image 1352 associated with a selected album, information 1354 pertaining to the selected album, and a "buy album" button 1356 to facilitates a user's purchase of access rights to all the songs on the selected album. In this example, the particular selected album "Party Mix/Mesopotamia" by the B-52s was previously selected through a browse operation with respect to FIG. 13A. However, upon the user selecting the toggle control 1320, the graphical user interface alters the first sub-window 1302 to that shown in FIG. 13B. The resulting graphical user interface facilitates the user's review of the album that has been identified by the browse operation. The user can not only directly buy the album through use of the "buy album" button 1356, but can also review the information 1354 and the associated image 1352. In one embodiment, the price is a fixed price per album. For example, the fixed price could be $9.99 per album. Additionally, the first sub-window 1302 can further include a Top Downloads region 1358 and a Related Items region 1360. The Top Downloads region 1358 can contain a list of the most frequently downloaded songs from the selected album. The Related Items region 1360 can contain a list of other songs that purchasers of the music from the artist of the selected album have also bought.

In the representative application program window 1350 shown in FIG. 13B, the second sub-window 1304 may or may not change as compared to the second sub-window 1318 shown in FIG. 13A. However, in other embodiments, the second sub-window 1318 can have its displayed list of songs changed or updated, or even be eliminated. Likewise, the third sub-window 1306 is not necessarily always present.

Further, it should be understood that the toggle control 1320 is also provided with the graphical user interface shown in FIG. 13B. Hence, the user can interact with the toggle control 1320 as shown in FIG. 13B to return to the graphical user interface depicted in the application program window 1300 shown in FIG. 13A. Further, a user could have performed a music search to initially produce the application program window 1350 shown in FIG. 13B. Such an approach would be an alternative to the use of the browse process such as depicted in FIG. 13A. In any case, through a search operation, the user can identify or locate a selected album and thus be presented with the graphical user interface shown in the application program window 1350 shown in FIG. 13B. Then, should the user desire to enter a browse mode, the user can select the browse control 1320 shown in FIG. 13B and thus be presented with the graphical user interface provided with the application program window 1300 shown in FIG. 13A. In other words, the user can use the browse control 1320 to transition between a browse mode and an informational mode.

Still another feature associated with the invention is illustrated with respect to FIGS. 13A and 13B. The second sub-window 1304 includes "buy song" buttons 1362 and "go to" buttons 1364, 1366 and 1368 for each of the songs listed in the second sub-window 1304. The "go to" buttons 1364, 1366 and 1368 are shown as small buttons with arrows symbols therein. As previously discussed, the "buy song" button 1362 can facilitate a user in easily purchasing access to the associated song. The selection of the "go to" button 1364 causes the first sub-window 1302 to display information pertaining to the associated artist (e.g., The B52s). The selection of the "go to" button 1366 causes the first sub-window 1302 to display information pertaining to the associated selected album. For example, if the user had selected the "go to" button 1366 shown in FIG. 13A, the first sub-window 1302 would then display the album information such as shown in FIG. 13B. If the user selects the "go to" button 1368 of either the application program window 1300 or the application program window 1350, a genre window for would be presented in the first sub-window 1302 (and/or the second sub-window 1304). In this example, the genre window would pertain to the genre of "pop." From the genre window, the user could interact to specify one or more selected genre and then proceed to locate music of interest.

Alternatively, when the media items being browsed as audio books, the "go to" button can cause a book page to be displayed and the buy buttons can indicate "buy book." Given that the audio data to be downloaded in the case of an audio book is sizeable, in one embodiment, the audio data for the audio book can be divided into a plurality of files which are separately downloaded. The audio quality for audio books can also be reduced as compared to musical songs as another means to reduce the amount of audio data required to be downloaded.

Figure 14A:
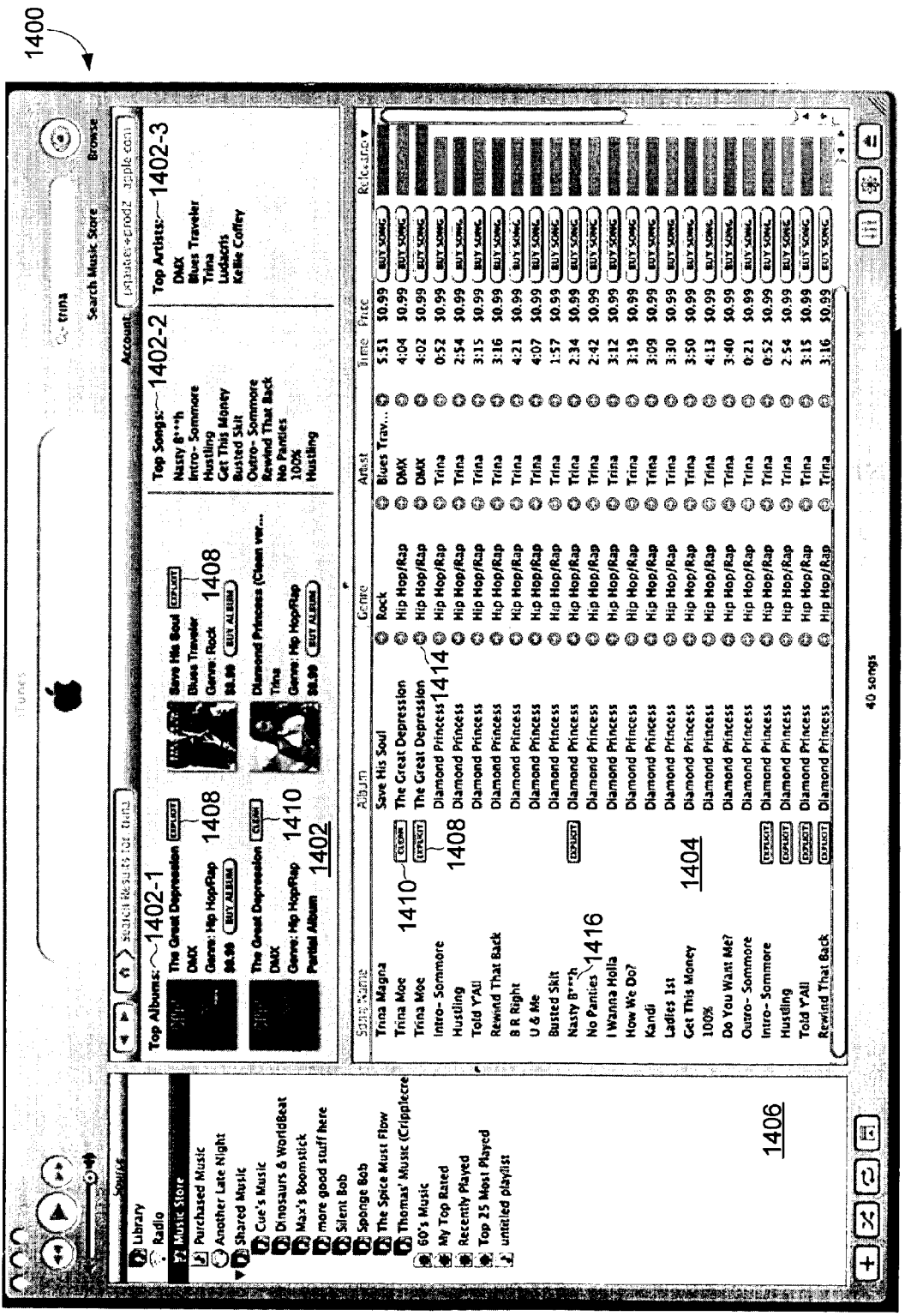
FIGS. 14A and 14B are screen shots illustrating explicit content notification features according to one embodiment of the invention.
Figure 14B:
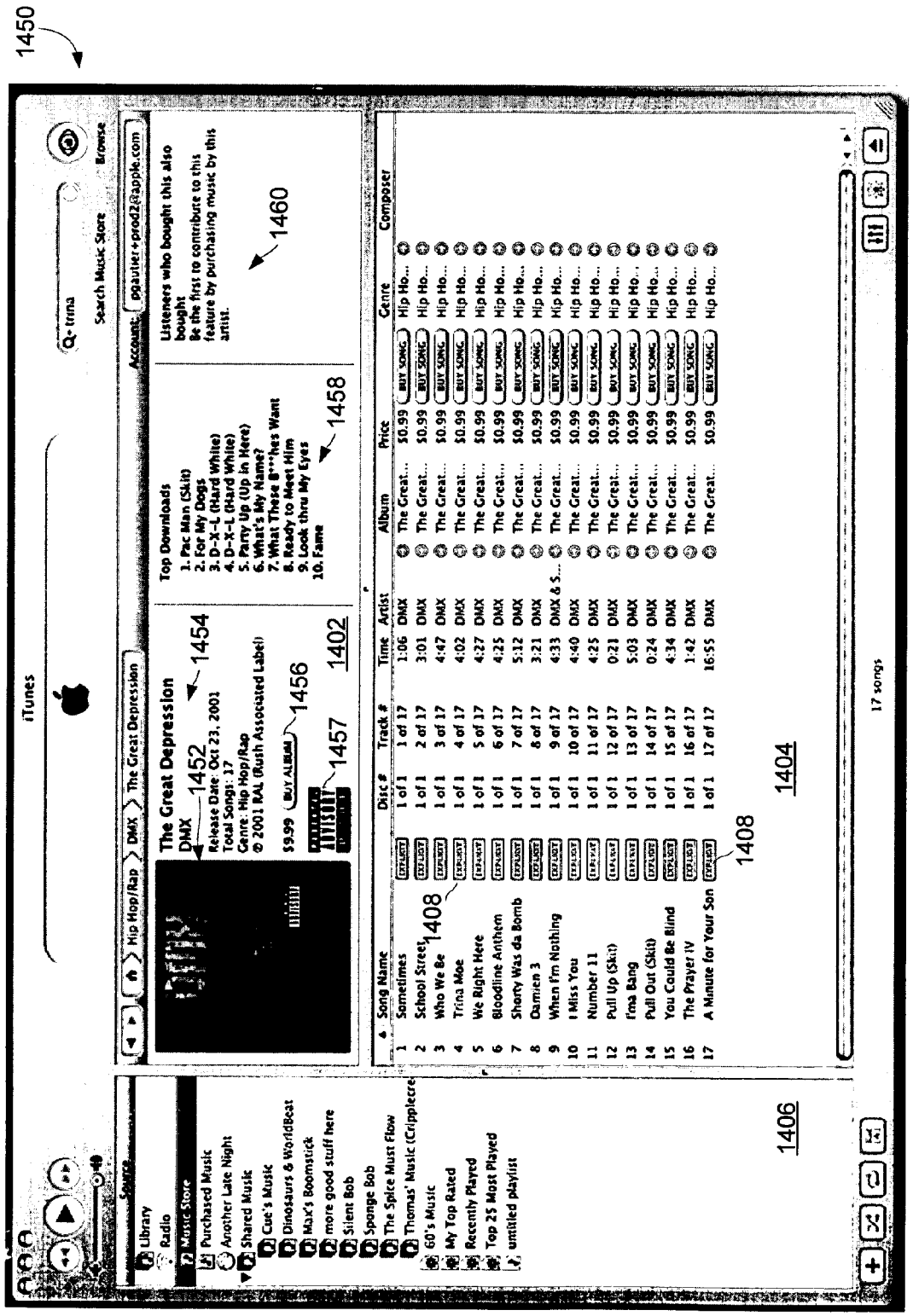

Still another aspect of the invention pertains to informing the users about explicit content that may be present in songs or albums. FIGS. 14A and 14B are screen shots illustrating explicit content notification features according to one embodiment of the invention.

FIG. 14A is a screen shot of an application program window 1400 according to one embodiment of the invention. The application program window 1400 includes a first sub-window 1402, a second sub-window 1404, and a third sub-window 1406. The first sub-window 1402 includes a Top Albums region 1402-1, a Top Songs region 1402-2, and a Top Artists region 1402-3. The Top Albums region 1402-1 contains those albums that match search criteria. For example, in this example, the search criteria was "trina" and the Top Albums regions 1402-1 depicts four separate albums that were identified by searching the music database with respect to the search criteria "trina". The Top Songs region 1402-2 includes a list of top songs with respect to any of the albums listed in the Top Albums regions 1402-1. The Top Artists region 1402-3 can represent the top artists with respect to the albums within the Top Albums region 1402-1. Alternatively, the Top Songs region 1402-2 in the top artists region 1402-3 could be top songs for the larger categories of genre, time period, or overall. Additionally, the second sub-window 1404 displays those songs that are associated with the albums within the Top Albums region 1402-1. In other words, the songs listed within the second sub-window 1404 are those songs that somehow relate to the search criteria.

It should also be noted that the application program window 1400 further includes explicit content indicators 1408 and clean content indicators 1410. In this regard, it is known that songs or albums can contain offensive language (e.g., expletives or other foul language) that is not appropriate for all audiences. Hence, albums or songs can be indicated as containing such explicit content through use of the explicit content indicator 1408. As shown in FIG. 14A, the explicit content indicator 1408 can be associated with an album, such as shown in the first sub-window 1402, and/or can be associated with individual songs, such as shown in the second sub-window 1404.

Further, in the case in which an album or song has explicit content, another version of the same album or song can be provided and thus made available for purchase with modifications to remove the explicit and potentially offending material. These types of songs or albums are indicated by the clean content indicator 1410.

If desired, a user can select one of the albums within the Top Albums region 1402-1 or through selection of one of the "go to" buttons 1414 for album information within the second sub-window 1404. If the user does select either the image 1412 or the "go to" button 1414, an application program window 1450 as shown in FIG. 14B would be produced according to one embodiment of the invention. In other words, the user selection was to select the album "The Great Depression" by DMX, namely, the explicit content version. As such, the first sub-window 1402 displays an image 1452 associated with the selected album, information 1454 pertaining to the album, and a "buy album" button 1456. Additionally, since the selected album has explicit content, the first sub-window 1402 can also display a parental advisory warning indication 1457 to alert potential purchasers that the selected album contains explicit content. The first sub-window 1402 can further include top downloads information 1458 and related song purchases information 1460. The second sub-window region 1404 can list those songs on the selected album. As shown in FIG. 14B, the selected album, "The Great Depression" contains seventeen songs or tracks, each of which is identified by an explicit content indicator 1408, thereby indicating that each of the songs or tracks contains explicit content.

Another aspect of the invention pertains to modification of media descriptors that contain offensive language. For example, media descriptors are often provided as titles to media items, such as albums, songs, videos or pictures. Occasionally, these media descriptors can contain offensive language. Hence, when media items are provided to a media store (or media database) to be stored and thus available for subsequent purchase, these media items can be reviewed to determine whether any offensive language is present within their media descriptors. Alternatively, the review for offensive language in the media descriptors can be done dynamically as these media items are requested by various media players. In either case, the offending portion of the media descriptors can be altered to remove the offensive language.

In one embodiment, each word within each of the media descriptors can be compared with a list of identified offending words stored in a file or database. For each offending word found with a media descriptor, a portion of the offensive word in the media descriptor can be altered through use of replacement characters. As an example, as shown in FIG. 14A, one of the song names (e.g., media descriptors) on the selected album is "Nasty Bitch". However, the song name is displayed as shown in FIG. 14A with a modified media designator 1416, namely, "Nasty B***h". Hence, in this embodiment, the internal characters of the offending word "bitch" were altered and thus replaced with an asterisk. The user knows how many characters were replaced by the number of asterisks and thus is provided with some context for the word even after it has been modified. However, once modified, the offending word is no longer offensive.

Another aspect of the invention pertains to a graphical user interface in which a scrolling type action that permits a user to scroll or flip through media items being displayed in an efficient, user-friendly manner. In one embodiment, a graphical user interface action or control can cause update (or replacement) from a displayed set of media items to a next set of media items. The update can, for example, include a transition effect when transitioning between different sets of media items.

Figure 15A:
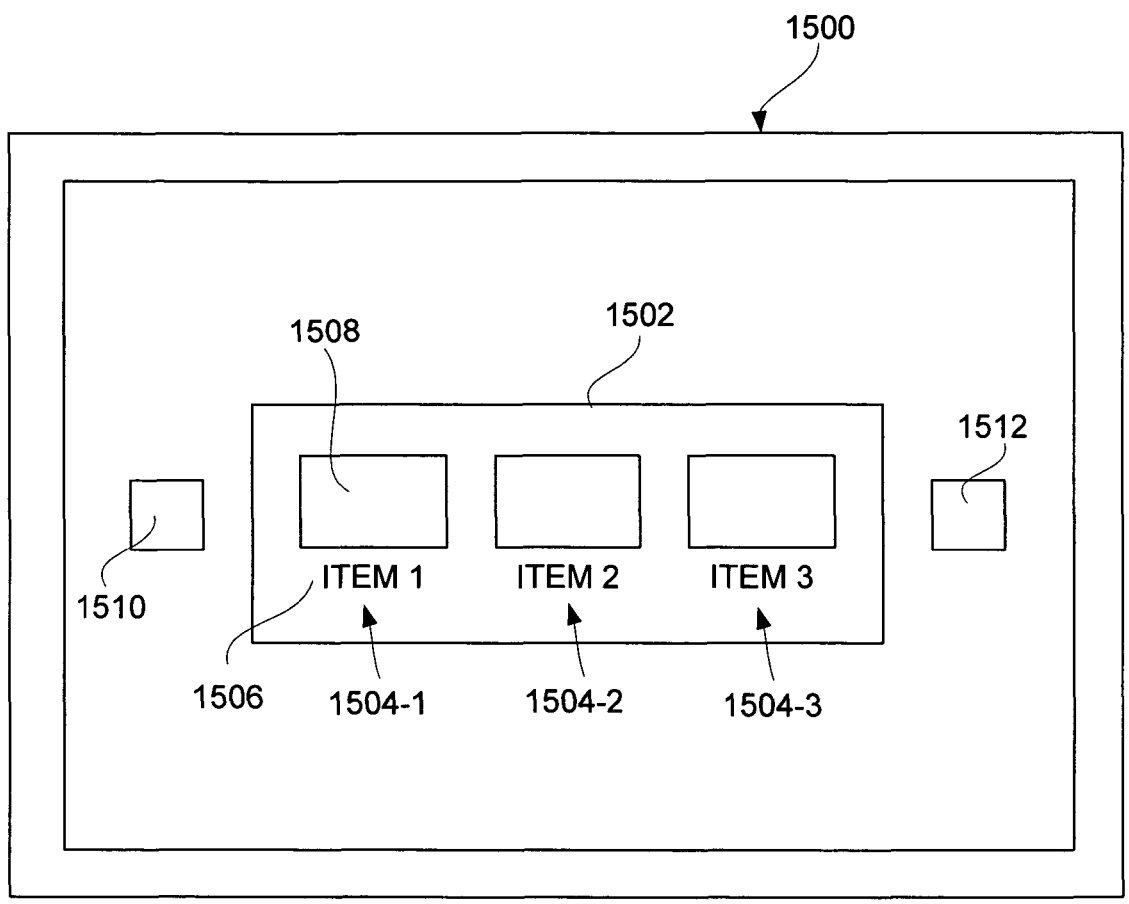
FIG. 15A is a diagram of an application program window according to one embodiment of the invention.

FIG. 15A is a diagram of an application program window 1500 according to one embodiment of the invention. The application program window 1500 is, for example, produced at a client machine by a media player, such as the media player 108 operating on the client 104 of FIG. 1. The application program window 1500 includes at least one sub-window 1502. Typically, the sub-window 1502 is associated with a category or grouping of media. Within the sub-window 1502 are displayed a plurality of media item representations 1504. As illustrated in FIG. 15A, the sub-window 1502 includes a first media item representation 1504-1, a second media item representation 1504-2, and a third media item representation 1504-3. For each of the media item representations 1504, the sub-window 1502 depicts a text descriptor 1506 and an image descriptor 1508. For example, the text descriptor can be a name that corresponds to the media item, and the image descriptor 1508 can pertain to an image (e.g., artwork) that is associated with the media item. In one embodiment, the image is rather small and thus can be referred to as a "thumbnail" image. In one implementation, the media items are albums of music, and thus the text descriptor 1506 pertains to the title of the album and the image descriptor 1508 pertains to the artwork of the album cover.

The sub-window 1502 typically displays only a small portion of the total number of media items that correspond to the category or grouping of media associated with the sub-window 1502. As such, the user needs the ability to transition to a next set of media items. The application program window 1500 includes next controls 1510 and 1512 to assist the user in transitioning to a next set of media items. The next control 1510 permits the user to transition to the left, and the next control 1512 allows the user to transition to the right. As discussed in more detail below with respect to FIG. 16, the content for the sub-window 1502, either initially or following the selection of one of the next controls 1510 and 1512 is provided by a remote server that stores the media item information that is displayed within the sub-window 1502. For example, the remote server can, in one embodiment, pertain to the media commerce server 102 illustrated in FIG. 1.

Figure 15B:
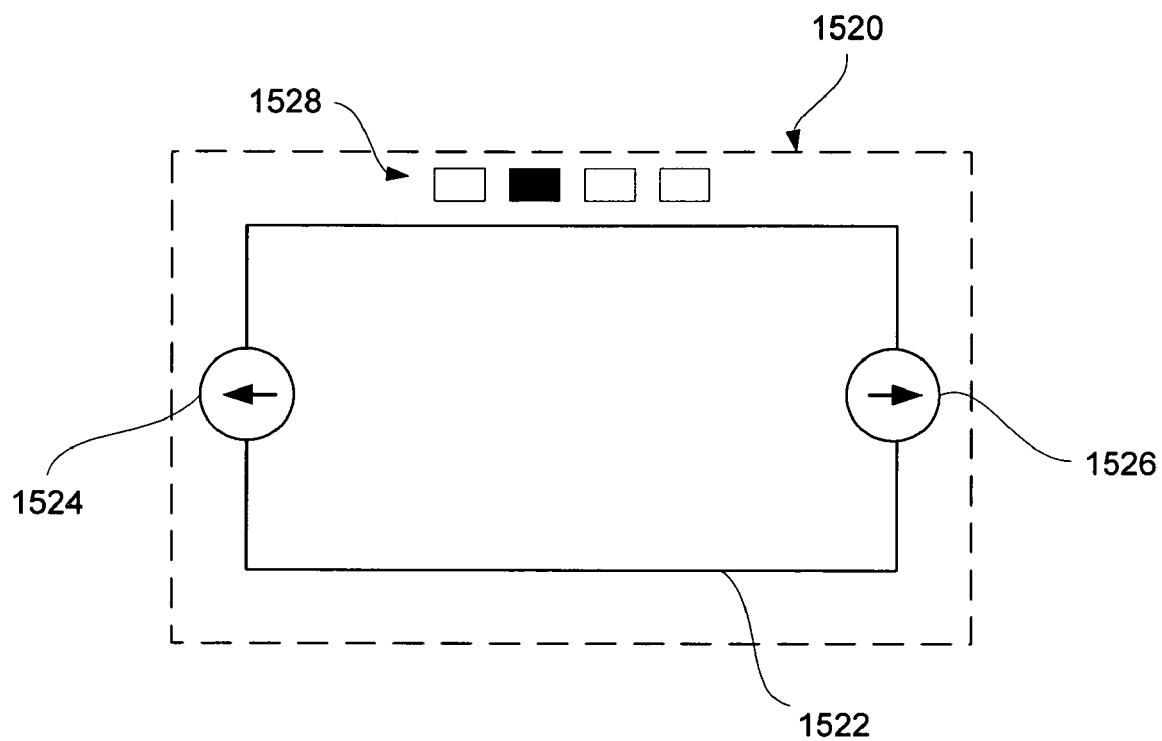
FIG. 15B is a diagram of a window according to one embodiment of the invention.

FIG. 15B is a diagram of a window 1520 according to one embodiment of the invention. The window 1520 is, for example, suitable for use as the sub-window 1502 illustrated in FIG. 15A. The window 1520 can also be considered a frame. In any case, the window 1520 includes window (frame) objects that pertain to objects of the window 1520 (frame). As shown in FIG. 15B, the window 1520 includes a display region 1522 and next controls 1524 and 1526. The display region 1522 represents a portion of the window 1520 that displays server-provided information pertaining to a of the media items available from the server. The next controls 1524 and 1526 are used by a user to request a next set of the media items available from the server. In particular, when the next control 1522 is selected, a load window (load frame) request is sent to the server. In one embodiment, the next control 1524 is an object of the window 1520 (frame) and contains information on the next set of the media items as well as a transition effect therefor. The transition effect can have various characteristics and styles that provide an animated transition between the display of a current set of media items and a subsequent set of media items. Although various transition effects can be used, some examples of transition effects are wipe, dissolve, drop-in, etc. Also the transition effect can have an acceleration/deceleration or speed characteristics that can, if provided, control the rate (e.g., speed and/or acceleration) of the transition effect (animation). Even with the transition effect, the new content for the display portion 1522 is display such that the next controls 1524 and 1526 are on top of the display region 1522. In other words, the animation (transition) effect causes the new content for the display portion 1522 to arrive in the display portion 1522 in a manner that is underneath the next controls 1524 and 1526. Similarly, if desired, the boundary of the window 1520 and the display region 1522 can have a shading effect, such shading effect can be an object of the frame and can also be displayed over top of the display region 1522. The server-provided information in response to the request is, for example, a markup language document (e.g., XML) that describes the layout therefore and its objects as well as contains links for data (e.g., artwork, title) for each of the media items within the set being displayed. In one embodiment, the frame can be displayed like a composite image such that back-to-front with the content for the display region 1522 being in the back and the other possible frame features (objects) being in the front, e.g., the next controls and a shading effect. The window 1520 can also include a position indicator 1528 that informs the user of the relative position within the various media items that are associated with and able to be displayed within the display portion 1522 (see also FIG. 15C).

Figure 15C:
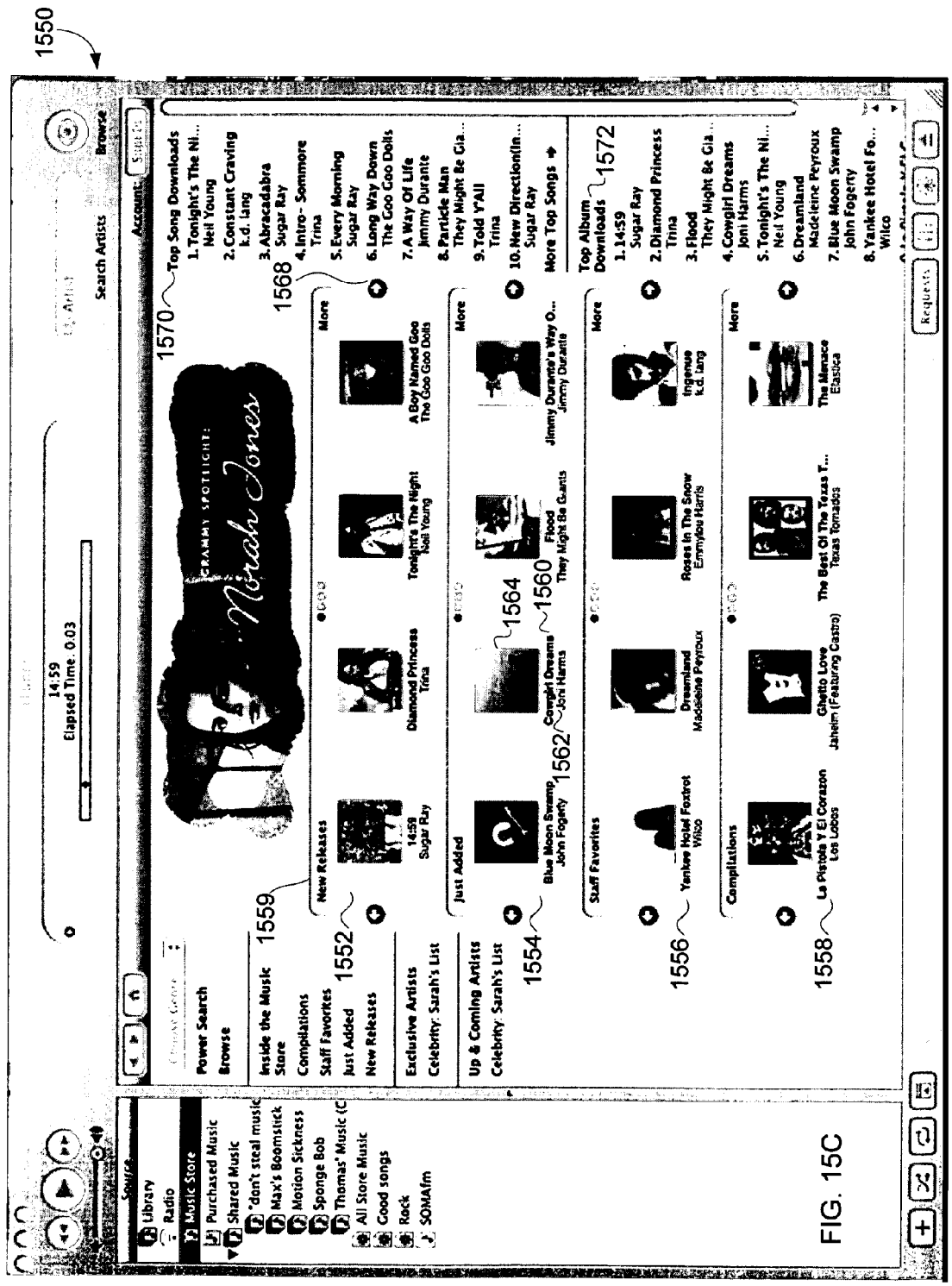
FIG. 15C is a screen shot of an application program window according to one embodiment of the invention.

FIG. 15C is a screen shot of an application program window 1550 according to one embodiment of the invention. The application program window 1550 represents one implementation of the application program window 1500 illustrated in FIG. 15A.

The application program window 1550, although produced by an application program, is presented in a network browser style, and thus looks like a web page in many respects. The application program window 1550, among other things, includes a first sub-window 1552, a second sub-window 1554, a third sub-window 1556, and a fourth sub-window 1558. Each of the sub-windows 1552-1558 displays four media items. More particularly, for each media item within each of the sub-windows 1552-1558, media information for each of the four media items is displayed. In one embodiment, for each media item being displayed within one of the sub-windows 1552-1558, the media item information being presented includes an album title 1560, an artist 1562, and album artwork 1564. The different sub-windows 1552-1558 represent different groupings or categories that the albums can be arranged in. In FIG. 15C, the exemplary groupings or categories are New Releases, Just Added, Staff Favorites, and Compilations. In one embodiment, each of the sub-windows 1552-1558 pertains to a frame. For example, a frame boundary 1559 surrounds the sub-window 1552.

Hence, the user can simultaneous view the basic information on four media items (e.g., albums) within each of the sub-windows 1552-1558. However, when the user desires to view other albums within one of the groups or categories, then the user can select one of the next controls 1566 and 1568. For example, with respect to the first sub-window 1552, the user is able to transition to the left using the next control 1566, or transition to the right using the next control 1568. The other sub-windows 1554-1558 similarly have next controls. Upon the user's selection of the next control 1568, a next set of four albums would be requested from the remote server, and then when received, would be displayed within the first sub-window 1552, thereby replacing the four media items previously displayed therein. The transition from the former set of media items to a next set of media items can be performed with an animated transition such that the user is shown the effect of the transition or scroll to the next set.

Additionally, the application program window 1550 shown in FIG. 15C includes a top song downloads region 1570 and a top albums download region 1572. The top song downloads region 1570 includes a list of the top songs that have been downloaded from the music store that is offering the various media items for purchase. The top albums download region 1572 displays a list of top albums that have been downloaded by users of the music store.

In one embodiment, the set of media data for the associated sub-window is provided in a markup language format. In one example, the markup language format is eXtensible Markup Language (XML) based. In the case where the media items are albums, such as shown in FIG. 15C, the artwork images are thumbnail sized so that the amount of data associated with a set of media data is relatively small and thus easily transmitted over a network from the remote server.

Figure 16:
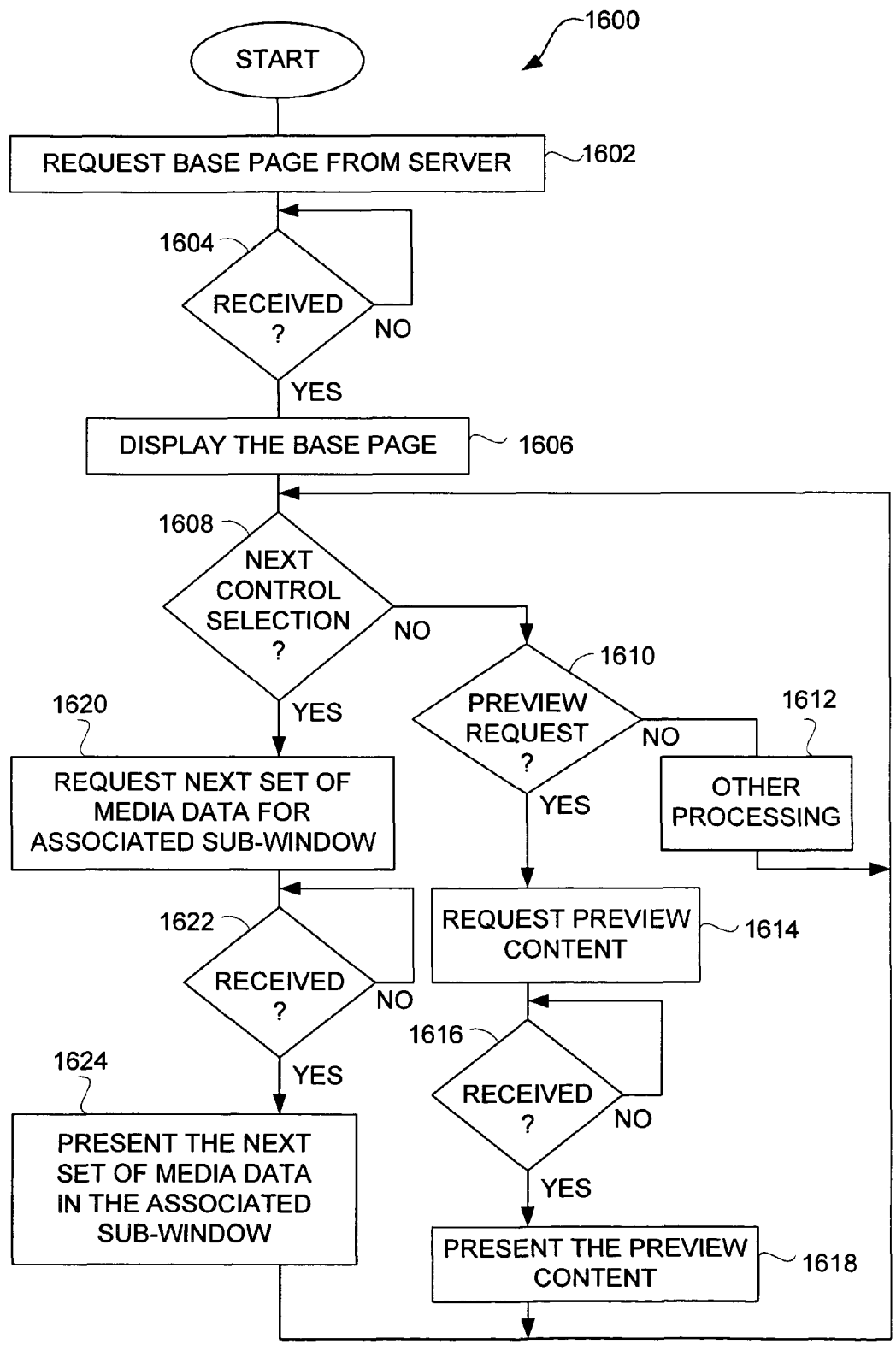
FIG. 16 is a flow diagram of media page processing according to one embodiment of the invention.

FIG. 16 is a flow diagram of media page processing 1600 according to one embodiment of the invention. The media page processing 1600 is, for example, performed by a media player, such as the media player 108 operating on the client 104 illustrated in FIG. 1. The media page processing 1600 can be performed by an application program to produce an application program window, such as the application program window 1500 illustrated in FIG. 15A and the application program window 1550 illustrated in FIG. 15B.

The media page processing 1600 is activated whenever a base page is to be presented within an application program window. Once the media page processing 1600 begins, a base page is requested 1602 from a remote server. The remote server is, for example, the media commerce server 102 illustrated in FIG. 1. The base page can vary with implementation but has the characteristics shown in FIGS. 15A and 15B with respect to a sub-window and next controls.

A decision 1604 then determines whether the base page has been received from the server. Once the decision 1604 determines that the base page has been received, then the base page is displayed 1606. At this point, the base page is presented on a display screen and includes at least one sub-window and at least one next control.

Then, a decision 1608 determines whether a next control selection has been made. When the user interacts with the base page to select the next control, then a next control selection has been made. However, the user may interact with the base page in a variety of different ways, including a next control selection or a preview request, or not at all. When the decision 1608 determines that a next control selection has not been made, then a decision 1610 determines whether a preview request has been made. When the decision 1610 determines that a preview request has not been made, then other processing 1612 can be performed and then the media page processing 1600 can return to repeat the decision 1608 and subsequent blocks. Alternatively, when the decision 1610 determines that a preview request has been made, then preview content is requested 1614 from the remote server. A decision 1616 then determines whether the preview content has been received. Once the decision 1616 determines that the preview content has been received, then the preview content is presented 1618. In one embodiment, the presentation 1618 of the preview content causes the preview content to be played. In one example, the preview content is a short audio file that is played by the media player for the benefit of the user. Following the operation 1618, the media page processing 1600 returns to repeat the decision 1608 and subsequent operations.

On the other hand, when the decision 1608 determines that a next control selection has been made, then a next set of media data for the associated sub-window is requested 1620. A decision 1622 then determines whether the next set of media data has been received. When the decision 1622 determines that the next set of media data has been received, then a next set of media data is presented 1624 in the associated sub-window. Typically, the next set of media data completely replaces the previous set of media data residing within the associated sub-window. An animated transition between the prior set of media data and the new set of media data can be performed to facilitate user awareness of the transitioning or updating operation. Following the operation 1624, the media page processing 1600 returns to repeat the decision 1608 and subsequent operations so that additional user interactions can be processed.

The various aspects, features, embodiments or implementations of the invention described above can be used alone or in various combinations.

The media items can pertain to audio items (e.g., audio files or songs, such as for music or audiobooks), video items (e.g., video files or movies), or image items (e.g., photos).

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of the invention is that purchased media items are able to be securely downloaded to a user's machine. Another advantage of the invention is that media items can be purchased with a single user interface action. Still another advantage of the invention is that media items available for purchase can be searched or browsed in an efficient, user-friendly manner. Yet another advantage of the invention is that media items having offensive content or descriptors can be distinguishably displayed and/or altered to signal the presence of or remove of the offensive matter.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for browsing media items via a client application program that connects to an online media store, said method comprising:
   (a) displaying an application program window associated with the client application program, the application program window including displayed content and at least one sub-window;
   (b) displaying a first set of media item representations in the sub-window, the first set of media item representations including a plurality of different media item representations, the media item representations corresponding to a plurality of media items, each of the media item representations including at least a text descriptor and an image for the media item corresponding thereto;
   (c) displaying a first direction control within or proximate to a first side of the sub-window;
   (d) displaying a second direction control within or proximate to a second side of the sub-window; and
   (e) moving the media item representations through the sub-window in a first direction in response to receiving a user selection of the first direction control or in a second direction in response to receiving a user selection of the second direction control, to thereby display a second set of media item representations in the sub-window, where each of the media item representations of the second set of media item representations is different than the media item representations of the first set of media item representations, wherein when the media item representations move through the sub-window in response to the user selection, the application program window does not otherwise move the displayed content through the application program window, wherein the moving (e) the media items representations through the sub-window operates to (i) move the media item representations within the first set out of the sub-window with a sliding animation and (ii) move the media item representation within the second set into the sub-window with a sliding animation, wherein the first and second direction controls are not moved by the sliding animation, wherein the media item representations are provided to the client application program by a remote server via a network, and wherein one or more characteristics of the sliding animation are controllable by data received from the remote server via the network, and wherein the one or more characteristics of the sliding animation include one or more of speed, acceleration and style.

2. A method as recited in claim 1, wherein said displaying (b) displays the media item representations in a horizontal manner, and wherein said moving (e) moves the media item representations in a horizontal manner.

3. A method as recited in claim 2, wherein the first direction is to the left of the sub-window, and the second direction is to the right of the sub-window.

4. A method as recited in claim 1, wherein the movement caused by said moving (e) is a scroll action through the sub-window in the first direction in response to receiving a user selection of the first direction control or in the second direction in response to receiving a user selection of the second direction control.

5. A method as recited in claim 4, wherein said displaying (b) displays the media item representations in a horizontal manner.

6. A method as recited in claim 5, wherein the scroll action is horizontal.

7. A method as recited in claim 4, wherein the first direction is to the left of the sub-window, and the second direction is to the right of the sub-window.

8. A method as recited in claim 1, wherein the sub-window is associated with a category or grouping of media.

9. A method as recited in claim 8, wherein the media item representations being displayed in the sub-window all pertain to the category or grouping.

10. A method as recited in claim 9, wherein the category or grouping of media pertains to new releases.

11. A method as recited in claim 1, wherein the image pertains to artwork associated with the media item corresponding thereto.

12. A method as recited in claim 1, wherein the image is a thumbnail-sized image.

13. A method as recited in claim 1, wherein the text descriptor pertains to a title of the media item.

14. A method as recited in claim 1,
wherein said displaying (b) displays the media item representations in a horizontal manner, and wherein said moving (e) moves the media item representations in a horizontal manner, wherein the sub-window is associated with a category or grouping of media, and wherein the media item representations being displayed in the sub-window all pertain to the category or grouping.

15. A method as recited in claim 1, wherein the media item is an album of music.

16. A method as recited in claim 1, wherein the media item is a song.

17. A method as recited in claim 1, wherein the one or more characteristics of the sliding animation include speed, acceleration and style.

18. A graphical user interface for scrolling through a plurality of media items, said graphical user interface comprising:

an application program window associated with a client application program;

at least one sub-window, within said application program window, for displaying a set of a plurality of media item representations, the media item representations corresponding to a plurality of media items, each of the media item representations including at least a text descriptor and an image for the media item corresponding thereto;

a first-side transition control for requesting first direction horizontal scrolling through sets of a plurality of the media item representations within said at least one sub-window; and a second-side transition control for requesting second direction horizontal scrolling through sets of a plurality of the media item representations within said at least one sub-window, wherein, in response to selection of said first-side transition control or said second-side transition control, each of the media item representations within a next set of a plurality of media item representations being displayed in said at least one sub-window is different than the media item representations within a prior set of a plurality of media item representations previously displayed, and wherein the first-side transition control and the second-side transition control induce horizontal scrolling relative to said at least one sub-window without inducing scrolling of the application program window, wherein the horizontal scrolling through said at least one sub-window operates to (i) move the media item representations within the prior set out of said at least one sub-window with a horizontal sliding animation and (ii) move the media item representation within the next set into said at least one sub-window with a horizontal sliding animation, wherein the first-side transition control and the second-side transition control are not moved by the horizontal sliding animation, wherein the media item representations are provided to the client application program by a remote server via a network, and wherein one or more characteristics of the horizontal sliding animation are controllable by data received from the remote server via the network, and wherein the one or more characteristics of the horizontal sliding animation include one or more of speed, acceleration and style.

19. A graphical user interface as recited in claim 18,
wherein said first-side transition control is a left-side transition control and is for requesting left direction scrolling, and wherein said second-side transition control is a right-side transition control and is for requesting right direction scrolling.

20. A graphical user interface as recited in claim 18, wherein the image pertains to artwork associated with the media item corresponding thereto.

21. A graphical user interface as recited in claim 20, wherein the image is a thumbnail-sized image.

22. A graphical user interface as recited in claim 18, wherein the text descriptor pertains to a title of the media item.

23. A graphical user interface as recited in claim 18, wherein the media item is an album of music.

24. A graphical user interface as recited in claim 18, wherein the media item is a song.

25. A graphical user interface as recited in claim 18, wherein the sub-window is associated with a category or grouping of media.

26. A graphical user interface as recited in claim 25, wherein the category or grouping pertains to new releases.

27. A graphical user interface as recited in claim 18, wherein said graphical user interface further comprises:
    a position indicator that indicates relative position of the displayed media item representations with respect to a larger set of available media item representations that can be displayed in said at least one sub-window.

28. A graphical user interface as recited in claim 18, wherein said at least one sub-window comprises:
    a first sub-window for displaying a first plurality of media item representations pertaining to a first category or grouping; and
    a second sub-window for displaying a second plurality of media item representations pertaining to a second category or grouping,
    wherein each of the first and second plurality of media item representations corresponds to a plurality of media items.

29. A graphical user interface as recited in claim 28, wherein each of said first sub-window and said second sub-window has said first-side transition control and said second-side transition control.

30. A graphical user interface for browsing through a plurality of media items, said graphical user interface comprising:
    a window, associated with a client application program, for displaying a set of a plurality of media item representations, the media item representations corresponding to a plurality of media items, the media item representations being provided to the client application program by an online media store via a network, each of the media item representations including at least a text descriptor and an image for the media item corresponding thereto;
    a first-side transition control for requesting a first transition effect of the media item representations within said window, wherein a current set of media item representations is moved out of said window in a first direction in accordance with a predetermined animation effect while a next set of media item representations is moved into said window in the first direction in accordance with a predetermined animation effect; and
    a second-side transition control for requesting a second transition effect of the media item representations within said window, wherein a current set of media item representations is moved out of said window in a second direction in accordance with a predetermined animation effect while a next set of media item representations is moved into said window in the second direction in accordance with a predetermined animation effect,
    wherein the first-side transition control and the second-side transition control are not moved by the predetermined animation effect,
    wherein said window represents a sub-window within an application program window, and wherein said first-side transition control and said second-side transition control induce transitions of media item representations with respect to the sub-window but not with respect to the entirety of the application program window,
    wherein the media item representations are provided to the client application program by the online media store via the network, and
    wherein one or more characteristics of the first transition effect and the second transition effect are controllable by data received from the online media store via the network, and wherein the one or more characteristics include one or more of speed, acceleration and style.

31. A computer readable medium including at least computer program code for browsing media items via a client application program that connects to an online media store, said method comprising:
    computer program code for displaying a set of a plurality of media item representations in a window, the media item representations corresponding to a plurality of media items, each of the media item representations including at least a text descriptor and an image for the media item corresponding thereto;
    computer program code for displaying a first direction control within or proximate to a first side of the window;
    computer program code for displaying a second direction control within or proximate to a second side of the window;
    computer program code for horizontally moving the set of the plurality of the media item representations through the window in a first direction in response to receiving a user selection of the first direction control; and
    computer program code for horizontally moving the set of the plurality of the media item representations through the window in a second direction in response to receiving a user selection of the second direction control,
    wherein each of the media item representations being displayed in the window are selectable, and wherein on selection of one of the media item representations being displayed, the window is updated to display media information pertaining to the selected one of the media item representations, and
    wherein said computer program code for moving the plurality of media item representations through the window operates to move the plurality of media item representations, but not the first direction control or the second direction control being displayed, through the window with an animation effect,
    wherein the window represents a sub-window within a window associated with the client application program, and wherein the first direction control and the second direction control induce movement of media item representations with respect to the sub-window but not with respect to the entirety of the window associated with the client application program,
    wherein the media item representations are provided to the client application program by a remote server via a network, and
    wherein one or more characteristics of the animation effect are controllable by data received from the remote server via the network, and wherein the one or more characteristics of the animation effect include one or more of speed, acceleration and style.

32. A computer readable medium as recited in claim 31, wherein said computer program code for moving the plurality of media item representations through the window operates to remove one or more media item representations from the window and add the same number of media item representations to the window.

33. A computer readable medium as recited in claim 31, wherein said computer program code for displaying always operates to display the same number of media item representations in the window regardless of any movement by said computer program code for moving.

34. A computer readable medium as recited in claim 31,
wherein said computer program code for displaying always operates to display a first set of the media item representations in the window, and
wherein said computer code for moving operates to display a second set of the media item representations in the window, where at least one of the media item representations of the second set of media item representations is different than the media item representations of the first set of media item representations.

35. A computer readable medium as recited in claim 31, wherein at least a portion of said computer program code is provided in a markup language document.

36. A computer readable medium as recited in claim 31, wherein said computer program code for displaying displays the media item representations in a horizontal manner.

37. A computer readable medium as recited in claim 36, wherein the first direction is to the left of the window, and the second direction is to the right of the window.

38. A method as recited in claim 1, wherein each of the media item representations being displayed in the sub-window are selectable, and wherein on selection of one of the media item representations being displayed, the sub-window is updated to display media information pertaining to the selected one of the media item representations.

39. A computer readable medium as recited in claim 31, wherein the one or more characteristics of the animation effect include speed, acceleration and style.

\* \* \* \* \*